(12) United States Patent
Pan et al.

(10) Patent No.: US 11,800,436 B2
(45) Date of Patent: *Oct. 24, 2023

(54) METHODS AND SYSTEMS FOR BEAMFORMED SYSTEM INFORMATION TRANSMISSION

(71) Applicant: INTERDIGITAL PATENT HOLDINGS, INC., Wilmington, DE (US)

(72) Inventors: Kyle Jung-Lin Pan, St. James, NY (US); Fengjun Xi, San Diego, CA (US); Chunxuan Ye, San Diego, CA (US); Moon-il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,508

(22) Filed: Nov. 29, 2021

(65) Prior Publication Data

US 2022/0167249 A1 May 26, 2022

Related U.S. Application Data

(63) Continuation of application No. 16/336,794, filed as application No. PCT/US2017/053916 on Sep. 28, 2017, now Pat. No. 11,191,007.

(Continued)

(51) Int. Cl.
*H04W 48/12* (2009.01)
*H04W 48/10* (2009.01)
(Continued)

(52) U.S. Cl.
CPC .......... *H04W 48/10* (2013.01); *H04L 5/0053* (2013.01); *H04W 8/005* (2013.01);
(Continued)

(58) Field of Classification Search
CPC ... H04W 48/10; H04W 8/005; H04W 72/046; H04W 72/21; H04W 72/30; H04W 48/14;
(Continued)

(56) References Cited

U.S. PATENT DOCUMENTS 9,867,197 B2   1/2018  Martin et al.
10,420,066 B2  9/2019  Sadeghi et al.
(Continued)

FOREIGN PATENT DOCUMENTS

GB     2 557 889     2/2019

OTHER PUBLICATIONS

NPL-CATT, "On-demand System Information Delivery Mechanism," 3GPP TSG RAN WG2 Meeting #95, R2-164811, Gothenburg, Sweden (Aug. 22-26, 2016) (Year: 2016).*

(Continued)

*Primary Examiner* — Lan-Huong Truong
(74) *Attorney, Agent, or Firm* — VOLPE KOENIG

(57) ABSTRACT

A method and apparatus for use in a wireless transmit receive unit (WTRU) for receiving and transmitting information blocks is disclosed. A WTRU receives transmitted broadcast information, the transmitted broadcast information including a first information block and a second information block. Based on information in the received second information block, the WTRU transmits a random access preamble. After the transmission of the random access preamble, the WTRU may receive a random access response. Based on information in the received random access response, the WTRU may transmit a message including control information indicating additional information blocks that the WTRU is requesting to receive. After transmission of the transmitted message, the WTRU may receive the additional information blocks. In an example, the transmitted broadcast information may be periodically transmit- (Continued)

ted broadcast information. In another example, the transmitted broadcast information may further include a primary synchronization signal and a secondary synchronization signal.

18 Claims, 22 Drawing Sheets

Related U.S. Application Data

(60) Provisional application No. 62/416,557, filed on Nov. 2, 2016, provisional application No. 62/401,094, filed on Sep. 28, 2016.

(51) Int. Cl.
| | |
|---|---|
| *H04L 5/00* | (2006.01) |
| *H04W 8/00* | (2009.01) |
| *H04W 72/044* | (2023.01) |
| *H04W 72/21* | (2023.01) |
| *H04W 72/30* | (2023.01) |

(52) U.S. Cl.
CPC ......... *H04W 72/046* (2013.01); *H04W 72/21* (2023.01); *H04W 72/30* (2023.01)

(58) Field of Classification Search
CPC ... H04L 5/0053; H04L 5/0048; H04B 7/0619; H04B 7/0617; H04B 7/0623
See application file for complete search history.

(56) References Cited

U.S. PATENT DOCUMENTS

| | | | |
|---|---|---|---|
| 2009/0011786 A1 | 1/2009 | Lee et al. | |
| 2014/0098761 A1* | 4/2014 | Lee | H04W 72/21 370/329 |
| 2015/0359003 A1* | 12/2015 | Kim | H04W 74/008 370/336 |
| 2015/0382205 A1 | 12/2015 | Lee et al. | |
| 2015/0382284 A1 | 12/2015 | Brismar et al. | |
| 2016/0119970 A1 | 4/2016 | Lee et al. | |
| 2016/0128006 A1 | 5/2016 | Ji et al. | |
| 2016/0164657 A1* | 6/2016 | Fan | H04W 56/001 370/280 |
| 2016/0234759 A1 | 8/2016 | Kubota et al. | |
| 2017/0064579 A1 | 3/2017 | Park et al. | |
| 2017/0171764 A1* | 6/2017 | Dimou | H04W 4/70 |
| 2017/0251500 A1* | 8/2017 | Agiwal | H04W 48/12 |

OTHER PUBLICATIONS

CATT, "On-demand System Information Delivery Mechanism," 3GPP TSG RAN WG2 Meeting #95, R2-164811, Gothenburg, Sweden (Aug. 22-26, 2016).
El Hattachi et al., "NGMN 5G White Paper," Version 1.0 (Feb. 2015).
ETRI, "Details of system information delivery in NR," 3GPP TSG-RAN WG2 Meeting #95, R2-165162, Göteborg, Sweden (Aug. 22-26, 2016).
Huawei et al., "Access mechanism for beam based approach," 3GPP TSG RAN WG1 Meeting #86, R1-166088, Gothenburg, Sweden (Aug. 22-26, 2016).
Intel Corporation, "System information for standalone NR deployment," 3GPP TSG-RAN WG2 Meeting #95, R2-165007, Gothenburg, Sweden (Aug. 22-26, 2016).
Interdigital Communications, "Considerations on NR-PBCH and System Information Delivery," 3GPP TSG RAN WG1 Meeting #88, R1-1702319, Athens, Greece (Feb. 13-17, 2017).
Interdigital Communications, "Performance Evaluation for Beam Centric Design for Broadcast Channel," 3GPP TSG RAN WG1 Meeting #87, R1-1612630, Reno, USA (Nov. 14-18, 2016).
International Telecommunciation Union, "IMT Vision—Framework and overall objectives of the future development of IMT for 2020 and beyond; M Series Mobile, radiodetermination, amateur and related satellite services," Recommendation ITU-R M.2083-0 (Sep. 2015).
Samsung, "System Information Signalling Design in NR," 3GPP TSG-RAN WG2 Meeting #95, R2-164693, Gothenburg, Sweden (Aug. 22-26, 2016).
Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).
Third Generation Partnership Project, "Technical Specification Group Radio Access Network; Study on Scenarios and Requirements for Next Generation Access Technologies; (Release 14)," 3GPP TR 38.913 V0.4.0 (Jun. 2016).
Third Generation Partnership Project, "Technical Specification Group Radio Access Network; Study on Scenarios and Requirements for Next Generation Access Technologies; (Release 14)," 3GPP TR 38.913 V14.3.0 (Jun. 2017).
Third Generation Partnership Project, "Technical Specification Group Radio Access Network; Requirements for further advancements for Evolved Universal Terrestrial Radio Access (E-UTRA) (LTE-Advanced) (Release 14)," 3GPP TR 36.913 V14.0.0 (Mar. 2017).
Third Generation Partnership Project, "Technical Specification Group Radio Access Network; Requirements for further advancements for Evolved Universal Terrestrial Radio Access (E-UTRA) (LTE-Advanced) (Release 13)," 3GPP TR 36.913 V13.0.0 (Dec. 2015).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.2.0 (Jun. 2016).
Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 13)3GPP TS 36.300 V13.4.0 (Jun. 2016).
Third Generation Partnership Project, "Technical Specification Group Radio Access Network; NR; Medium Access Control (MAC) protocol specification (Release 15)," 3GPP TS 38.321 V1.0.0 (Sep. 2017).
Third Generation Partnership Project, "Technical Specification Group Radio Access Network; NR; NR and NG-RAN Overall Description; Stage 2 (Release 15)," 3GPP TS 38.300 V1.0.0 (Sep. 2017).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.7.0 (Sep. 2017).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.4.0 (Sep. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.4.0 (Sep. 2017).
Third Generation Partnership Project, "Technical Specification Group Radio Access Network; Evolved Universal Terrestrial Radio Access (E-UTRA) and Evolved Universal Terrestrial Radio Access Network (EUTRAN); Overall description; Stage 2 (Release 13)," 3GPP TS 36.300 V13.9.0 (Sep. 2017).
Third Generation Partnership Project, "Technical Specification Group Radio Access Network; NR; Radio Resource Control (RRC); Protocol specification (Release 15)," TS 38.331 V0.1.0 (Oct. 2017).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.2.0 (Jun. 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.7.0 (Sep. 2017).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.4.0 (Sep. 2017).

* cited by examiner

METHODS AND SYSTEMS FOR BEAMFORMED SYSTEM INFORMATION TRANSMISSION

CROSS REFERENCE TO RELATED APPLICATIONS

This application is a continuation of U.S. patent application Ser. No. 16/336,794 filed Mar. 26, 2019, which issued as U.S. Pat. No. 11,191,007 on Nov. 30, 2021, which is the U.S. National Stage, under 35 U.S.C. § 371, of International Application No. PCT/US2017/053916 filed Sep. 28, 2017, which claims the benefit of U.S. Provisional Application No. 62/401,094 filed Sep. 28, 2016 and U.S. Provisional Application No. 62/416,557 filed Nov. 2, 2016, the contents of which are all hereby incorporated by reference herein.

BACKGROUND

A broad classification of use cases for emerging 5G New Radio (NR) systems include, but are not limited to, the following: Enhanced Mobile Broadband (eMBB), Massive Machine Type Communications (mMTC) and Ultra Reliable and Low latency Communications (URLLC). The use cases are based on general requirements set out by ITU-R, NGMN, and 3GPP. The different use cases may focus on different requirements such as higher data rate, higher spectrum efficiency, low power and higher energy efficiency, lower latency and higher reliability. A wide range of spectrum bands ranging from 700 MHz to 80 GHz are being considered for a variety of deployment scenarios.

It is well known that as the carrier frequency increases, severe path loss becomes a crucial limitation to guarantee the sufficient coverage area. Transmissions in millimeter wave systems could additionally suffer from non-line-of-sight losses, (e.g., diffraction loss, penetration loss, Oxygen absorption loss, foliage loss, and the like). During initial access, a base station and a wireless transmit/receive unit (WTRU) need to overcome these high path losses and discover each other. Utilizing dozens or even hundreds of antenna elements to generate a beam formed signal is an effective way to compensate the severe path loss by providing significant beam forming gain. Beamforming techniques may include digital, analog and hybrid beamforming. After initial access, the WTRU proceeds to receive system information from the base station over a logical channel broadcast control channel (BCCH).

SUMMARY

A method and apparatus for use in a wireless transmit receive unit (WTRU) for receiving system information. A WTRU receives a broadcast signal from a gNB, wherein the broadcast signal includes system information. The WTRU determines configuration information associated with the received system information and the WTRU transmits a signal to the gNB using the determined configuration information associated with the received system information. The configuration information includes an indication regarding whether the WTRU is able to include any one or a combination of a request signal or a feedback signal in the signal transmitted to the gNB. The transmitted signal to the gNB may include a preamble that indicates system information block (SIB) request information. The transmitted signal to the gNB may include a control field that indicates additional SIB request information. The transmitted signal may provide feedback for the received system information. The WTRU then receives system information from the gNB in response to the transmitted signal. The received system information in response to the transmitted signal is one or more SIBs. The received system information in response to the transmitted signal is received periodically in defined locations or aperiodically.

The preamble may be associated with one or more SIBs. The preamble may indicate SIB request information. The preamble may be associated with one or more groups of SIBs, each group of SIBs being associated with a priority level. The configuration information may include mapping information that provides an association between the preamble and one or more SIBs.

The WTRU may receive the broadcast signal in one or more directional beams and the feedback signal included in the transmitted signal provides feedback for one or more directional beams. The feedback includes any one or a combination of beam information associated with the WTRU and an indication regarding whether the received first system information satisfies reception criteria. The reception criteria include a detected energy of the first system information being above a predetermined threshold. The reception criteria include a cyclic redundancy check (CRC) associated with the first system information being passed.

In an additional example, a WTRU receives transmitted broadcast information, the transmitted broadcast information including a first information block and a second information block. Based on information in the received second information block, the WTRU transmits a random access preamble. After the transmission of the random access preamble, the WTRU may receive a random access response. Based on information in the received random access response, the WTRU may transmit a message including control information indicating additional information blocks that the WTRU is requesting to receive. After transmission of the transmitted message, the WTRU may receive the additional information blocks.

In an example, the transmitted broadcast information may be periodically transmitted broadcast information. In another example, the transmitted broadcast information may further include a primary synchronization signal and a secondary synchronization signal. In a further example, the first information block may be a master information block (MIB), the second information block may be a SIB type 1 (SIB 1), the additional information blocks may be additional SIBs, and the transmitted message may be a message 3 (MSG3). Further, the transmitted message may be transmitted to a base station to request on-demand additional information blocks.

In yet another example, the base station may transmit using a plurality of beams and the WTRU may search the plurality of beams to select a beam, wherein the periodically transmitted broadcast information may be received using the selected beam and the transmitted random access preamble may be associated with the selected beam. Further, the WTRU may transmit information requesting beams and receive data using one of the requested beams. Also, at least the first information block may be swept over the plurality of beams. Additionally, at least one of the additional information blocks may be received by the WTRU using a beam of the plurality of beams that is different from the selected beam. Moreover, the beam that is used to receive the at least one of the additional information blocks may be indicated in downlink control information (DCI).

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
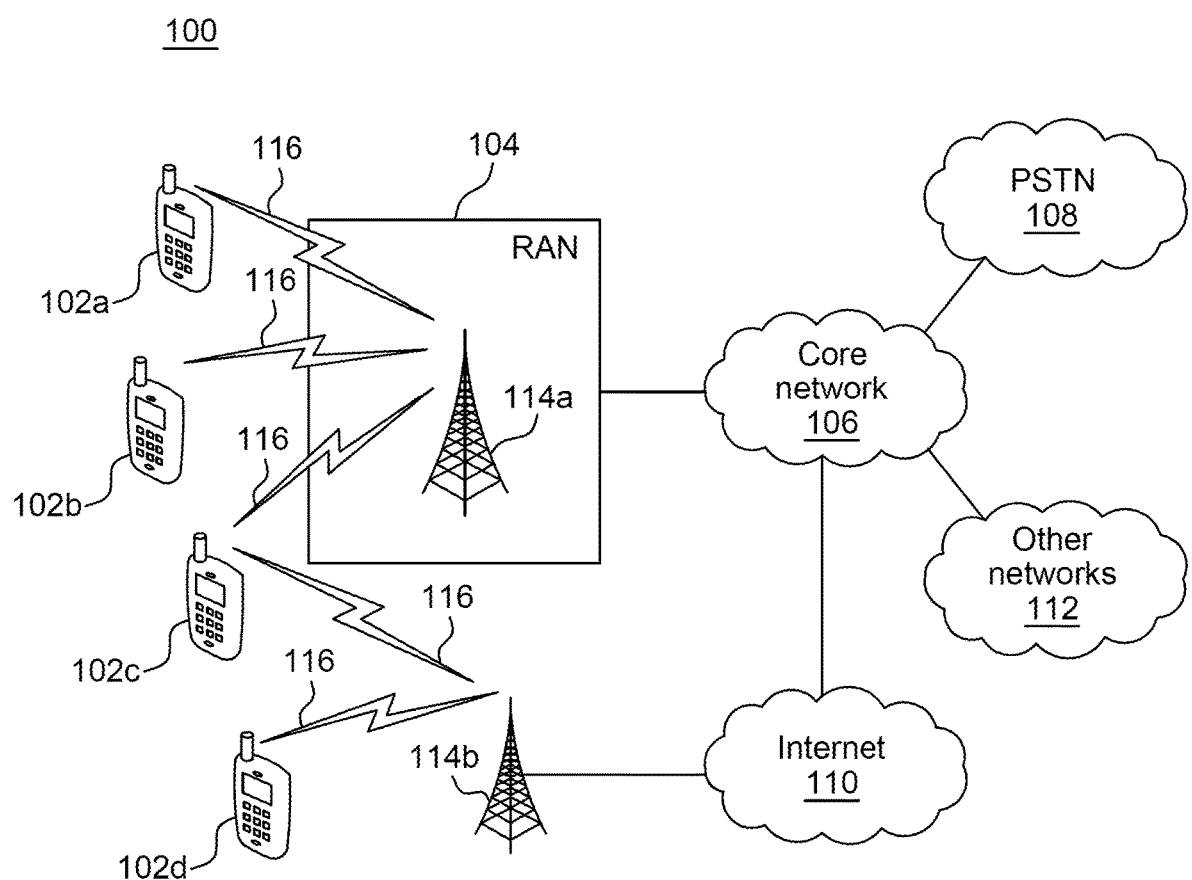
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
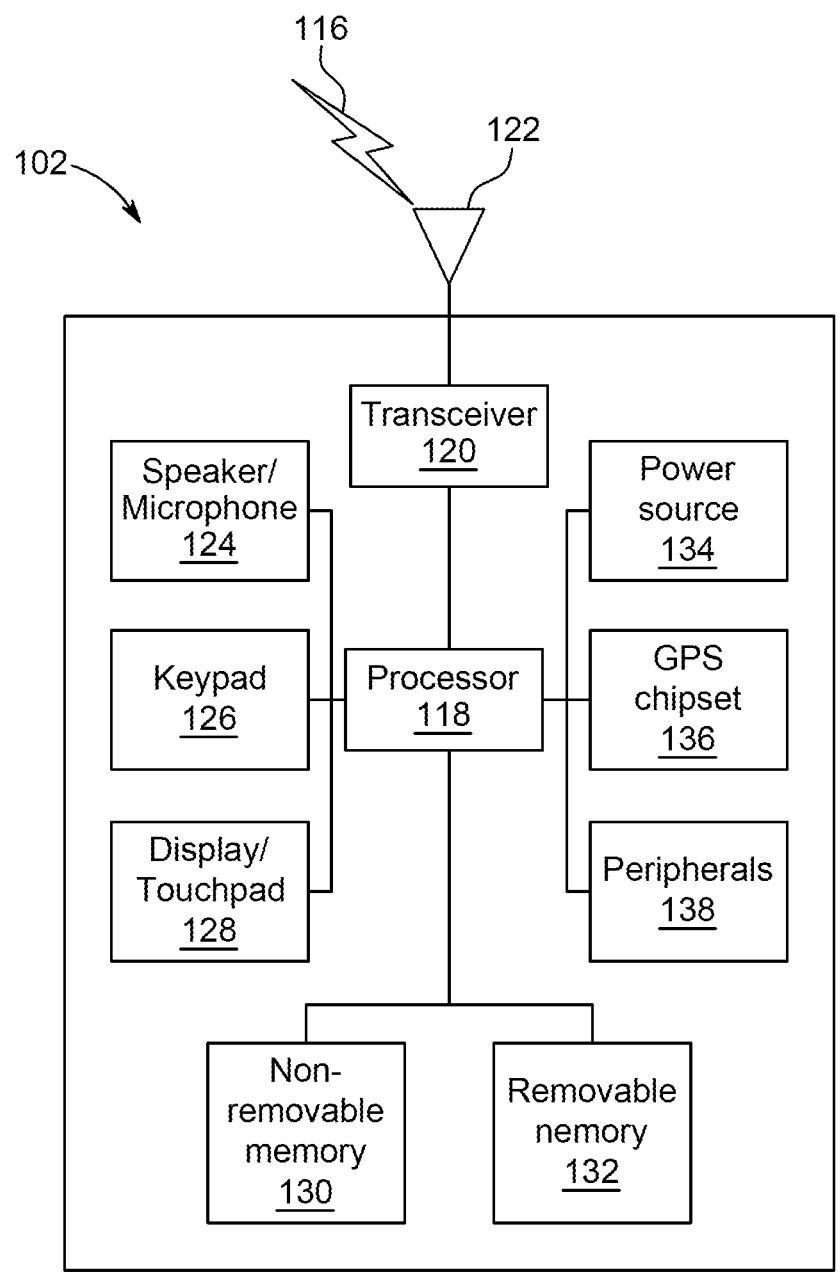
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
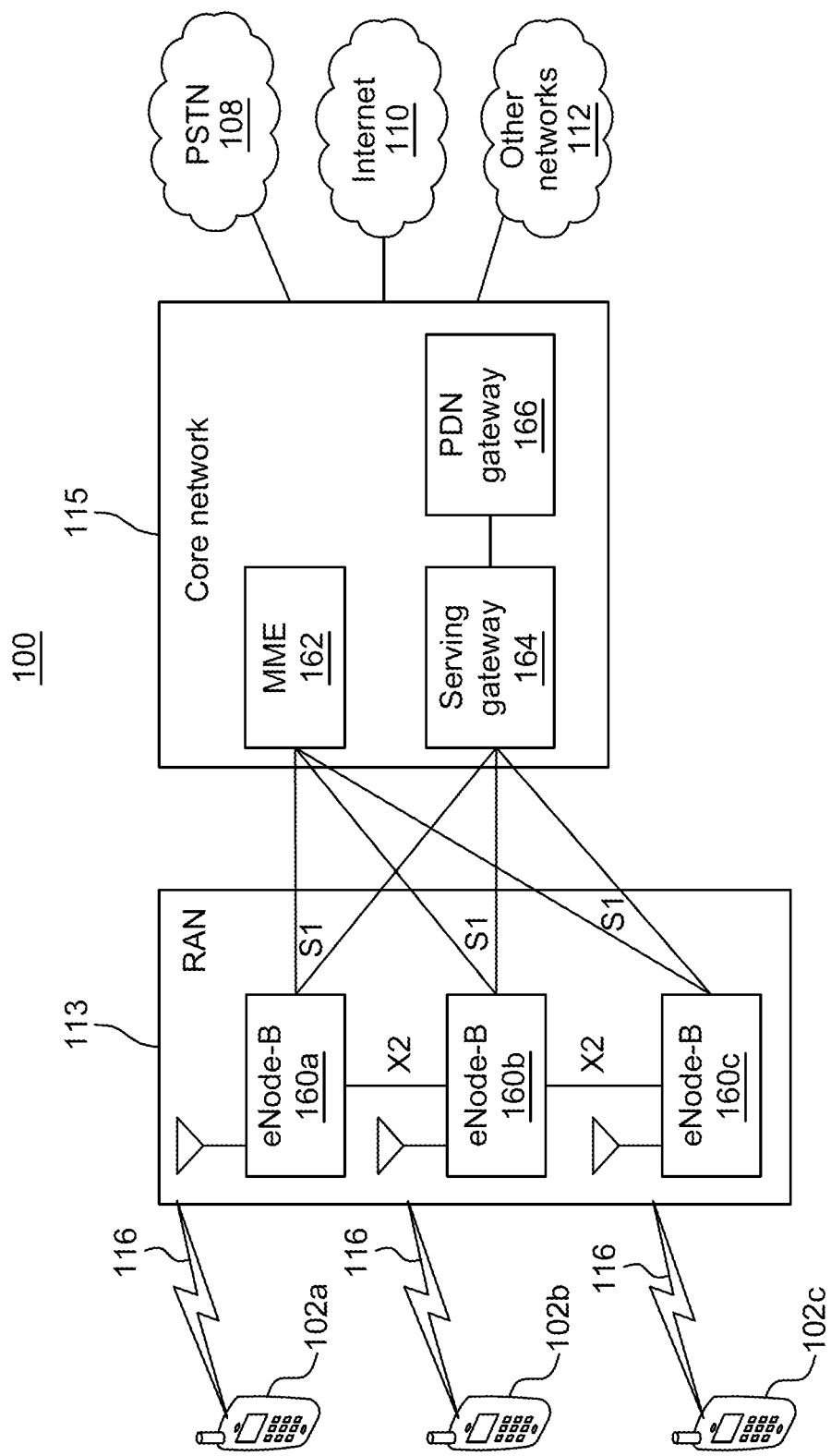
FIG. 1C is a system diagram illustrating an example radio access network (RAN) and an example core network (CN) that may be used within the communications system illustrated in FIG. 1A according to an embodiment.

FIG. 1C is a system diagram illustrating the communication system 100 including a RAN 113 and a CN 115 according to an embodiment. As noted above, the RAN 113 may employ an E-UTRA radio technology to communicate with the WTRUs 102a, 102b, 102c over the air interface 116. The RAN 113 may also be in communication with the CN 115.

The RAN 113 may include eNode-Bs 160a, 160b, 160c, though it will be appreciated that the RAN 113 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 115 shown in FIG. 1C may include a mobility management entity (MME) 162, a serving gateway (SGW) 164, and a packet data network (PDN) gateway (PGW) 166. While the foregoing elements are depicted as part of the CN 115, it will be appreciated that any of these elements may be owned and/or operated by an entity other than the CN operator.

The MME 162 may be connected to each of the eNode-Bs 162a, 162b, 162c in the RAN 113 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 113 and other RANs (not shown) that employ other radio technologies, such as GSM and/or WCDMA.

The SGW 164 may be connected to each of the eNode Bs 160a, 160b, 160c in the RAN 113 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 115 may facilitate communications with other networks. For example, the CN 115 may provide the WTRUs 102a, 102b, 102c with access to circuit-switched networks, such as the PSTN 108, to facilitate communications between the WTRUs 102a, 102b, 102c and traditional land-line communications devices. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
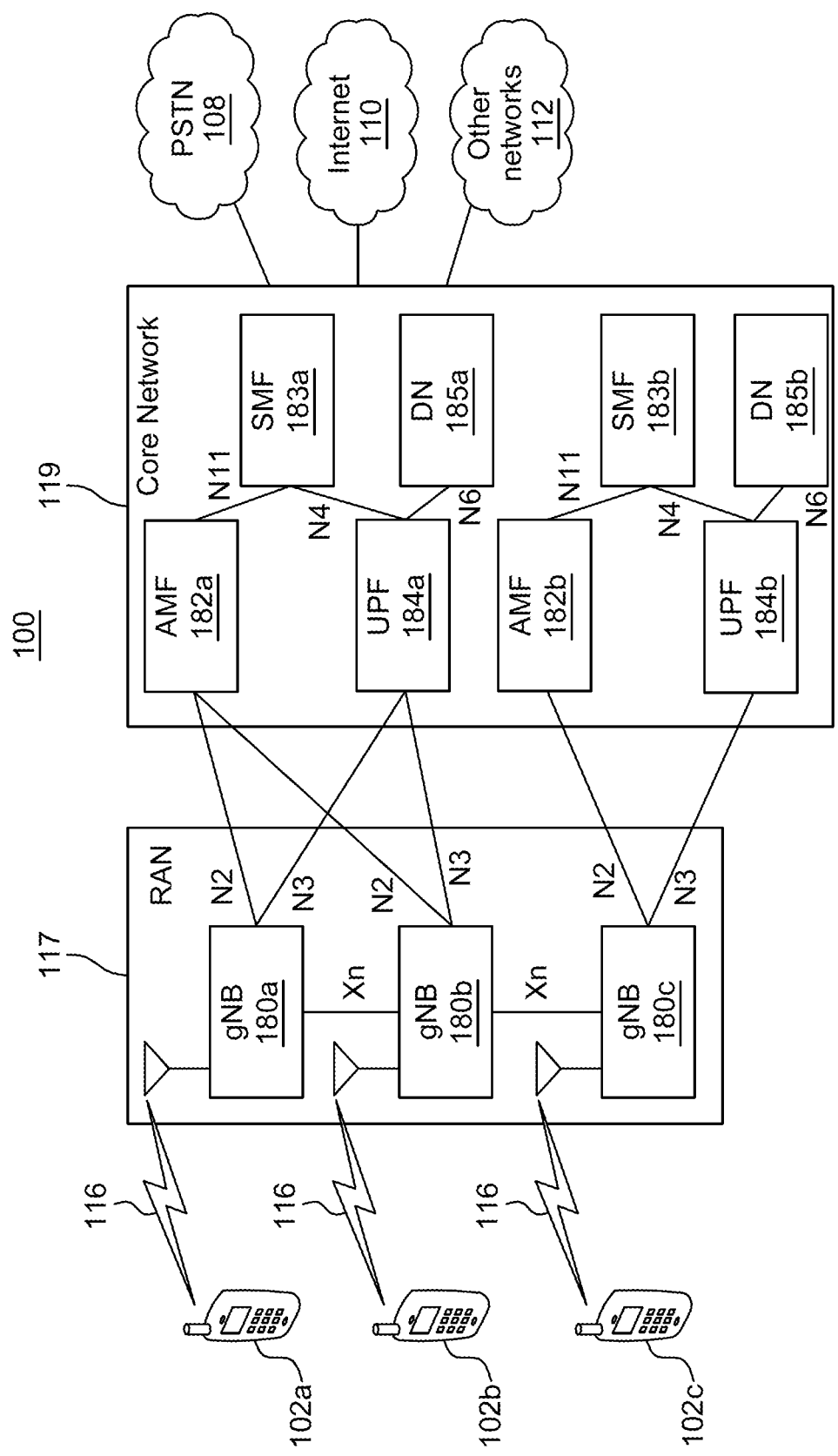
FIG. 1D is a system diagram illustrating a further example RAN and a further example CN that may be used within the communications system illustrated in FIG. 1A according to an embodiment.

FIG. 1D is a system diagram illustrating the communication system 100 including a RAN 117 and a CN 119 according to an embodiment. As noted above, the RAN 117 may employ an NR radio technology to communicate with the WTRUs 102a, 102b, 102c over the air interface 116. The RAN 117 may also be in communication with the CN 119.

The RAN 117 may include gNBs 180a, 180b, 180c, though it will be appreciated that the RAN 117 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 119 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 119, it will be appreciated that any of these elements may be owned and/or operated by an entity other than the CN operator.

The AMF 182a, 182b may be connected to one or more of the gNBs 180a, 180b, 180c in the RAN 117 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 117 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 119 via an N11 interface. The SMF 183*a*, 183*b* may also be connected to a UPF 184*a*, 184*b* in the CN 119 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 117 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 119 may facilitate communications with other networks. For example, the CN 119 may include, or may communicate with, an IP gateway (e.g., an IP multimedia subsystem (IMS) server) that serves as an interface between the CN 119 and the PSTN 108. In addition, the CN 119 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In LTE systems, system information (SI) is broadcasted by an eNB over a logical channel BCCH. This logical channel information is further carried over a transport channel (e.g., a broadcast channel (BCH)) or carried by a downlink shared control channel (DL-SCH). There are two parts in SI: a static part and a dynamic part. The static part is called a master information block (MIB) and is transmitted using BCH and carried by a physical broadcast channel (PBCH) once every 40 ms. The MIB carries useful information which includes channel bandwidth, physical hybrid-ARQ indicator channel (PHICH) configuration details, transmit power, number of antennas, and system information block (SIB) scheduling information transmitted along with other information on the DL-SCH. The dynamic part is called a SIB and is mapped on radio resource control (RRC) SI messages over a DL-SCH (e.g., SI-1, SI-2, SI3, etc.) and is transmitted using a physical downlink shared channel (PDSCH) at periodic intervals. For example, SI-1 is transmitted every 80 ms, SI-2 is transmitted every 160 ms and SI-3 is transmitted every 320 ms.

In LTE systems, there are 13 types of system information blocks (SIBs), which helps WTRUs to access a cell, perform cell re-selection, information related to INTRA-frequency, INTER-frequency and INTER-RAT cell selections. Each SIB has its own job to do, (i.e., each SIB is meant to carry information which is related to perform their assigned job). After initial cell synchronization and reading a MIB, a WTRU proceeds to read SIBs to obtain important cell access related parameters. For example, SIB1 broadcasts common information to all WTRU s in the cell related to cell access parameters and information related to scheduling of other SIBs. Hereinafter, the terms system information transmission and SIB transmission may be used interchangeably.

The following properties need to be considered for an initial access signal design in NR systems.

An initial access signal design in NR systems should minimize an always-on signal for system information. This improves the network energy efficiency as it transmits a system information signal only when needed. In addition, it supports forward compatibility since the resources can be flexibly scheduled for legacy or new signals.

The initial access related signals in NR systems should also be transmitted with a beam-based transmission scheme. Due to coverage loss from severe pathloss in high frequency, beamforming may need to be used to compensate the pathloss even for initial access signals (e.g., PBCH and SIBs).

The initial access signal design in NR systems also needs to efficiently transmit system information in order to reduce beam sweep overhead and save power. A beam sweeping mechanism could be used to cover a cell in which all beams in a cell are swept to transmit a signal. However, this may result in unnecessary energy consumption. The energy loss or resource waste from beam sweeping should be minimized.

The initial access signal design in NR systems should also enhance SIB performance for critical information (e.g., use of one or more SIBs and each SIB has a different priority level).

In NR systems, a broadcasting channel may be an always-on signal which may be transmitted periodically in a predefined time/frequency locations. This always-on signal may unnecessarily waste time/frequency resources and network energy in an NR system if there is no WTRU requiring the broadcasting signal. Accordingly, a WTRU request-based broadcasting signal transmission may be used to minimize always-on signals in a network.

In a beam-based system, a sweeping of all beams used in the system for broadcasting signal transmission may need to be supported, where each beam may cover a specific location within a cell coverage area. In this case, sweeping of all beams when the broadcasting signals are requested for a subset beams may result in system throughput loss and network energy waste.

A beam sweeping mechanism or beam sweeping refers to the sending or transmitting of a signal with a set of beams, where the set of beams may be used, selected, determined, or transmitted in a different time and/or frequency domain. In an example, beam sweeping describes that a signal transmission is transmitted with a set of beams in consecutive time resources. Hereafter, a full beam sweeping may be a beam sweeping with a full set of beams (e.g., all beams used for a signal transmission) and a partial beam sweeping may be a beam sweeping with a subset of beams (e.g., a subset of beams used for a signal transmission). A partial beam sweeping, selective beam sweeping, subset beam sweeping, and active beam sweeping may be used interchangeably.

NR systems may use a selective beam sweeping with a periodic broadcasting signal. For example, a broadcasting signal may be transmitted periodically in a predefined or a configured time/frequency resources and a set of beams may be used in each period for the broadcasting signal, wherein the set of beams may be determined dynamically or semi-statically. The use of a periodic broadcasting signal may reduce always-on signals in the system.

A beam that may be used for a broadcasting signal (e.g., a beam in the set of beams for beam sweeping) in a period may be referred to as an active beam and/or an active status. A beam that may be unused for a broadcasting signal (e.g., a beam not in the set of beams for beam sweeping) in a period may be referred to as an inactive beam and/or an inactive status.

A broadcasting signal may be transmitted with a set of beams in a period (e.g., periodicity may be N TTIs) and the number of time or frequency resources used for the broadcasting signal may be determined based on the number of beams in the set (e.g., the same as the number of beams in the set). For example, if M beams are used in the set, then M time resources may be used for a beam sweeping.

A time/frequency resource associated with a beam may be predefined or configured in a period. Examples of a time/frequency resource associated with a beam being predefined or configured in a period are described below.

A time/frequency resource associated with an inactive beam may be used for other signal transmissions. For example, a WTRU may attempt to receive or monitor a downlink signal (e.g., control channel, reference signal, and/or data channel) in a time/frequency resource associated with inactive beam while the WTRU attempts to receive or monitor a broadcasting signal in the time/frequency resource associated with an active beam.

A WTRU may receive an indication of a beam state for a time/frequency resource associated with a beam, wherein the indication may be implicitly or explicitly signaled. For example, a WTRU may receive an indication of a beam state based on the reference signal used or transmitted in the time/frequency resource. If a WTRU received a first type of reference signal, then the beam state is active. If the WTRU received a second type of reference signal, then the beam state is inactive. The first type and second type of reference signal may be determined based on at least one of a reference signal pattern, a scrambling sequence, a scrambling sequence ID, and the like.

A time/frequency resource associated with a beam may be dynamically determined. For example, a time/frequency resource may be preconfigured or predefined in a period and an associated beam for the time/frequency resource may be dynamically determined based on the set of beams used for beam sweeping in the period. Examples of a time/frequency resource associated with a beam being dynamically determined are described below.

A WTRU may be indicated the set of beams used in a period. For example, if M beams are used in the period, then the WTRU may be indicated with the number of beams in the set and which beams are in the set. A bitmap may be signaled to indicate which beams are active beams. Consecutive time resources may be used for beam sweeping and the number of consecutive time resources may be determined based on the number of active beams. A WTRU may receive or attempt to decode a broadcasting signal when the associated beam is active. Otherwise, the WTRU may skip receiving a broadcasting signal in a period.

All beams may be in an active state in an initial beam state, wherein the initial beam state may be reset every N transmission time intervals (TTIs). The initial beam state may assume all beams are in active state where the initial beam state may be reset every X TTIs. Between resets, the beam state may remain the same.

A gNB may transmit beams in the active state in each period for a broadcasting signal and the gNB may turn-off beams in the inactive state or use for other purpose. A New Radio physical downlink control channel (NR-PDCCH) with New Radio system information radio network temporary identifier (NR-SI-RNTI) may be used to schedule a New Radio physical downlink shared channel (NR-PDSCH for the beams in the active state.

Hereafter, a broadcasting signal may include any one or a combination of a master information block (MIB), one or more of system information blocks (SIBs), a cell-ID, and/or the like.

A selective beam sweep may continue to transmit system information based on the same determined beam state until next reset of beam state. During a beam state reset, the beam state may change for a next cycle. A beam state reset may occur first and may be followed by a reporting period which is then followed by one or multiple selective beam sweep periods.

Figure 2:
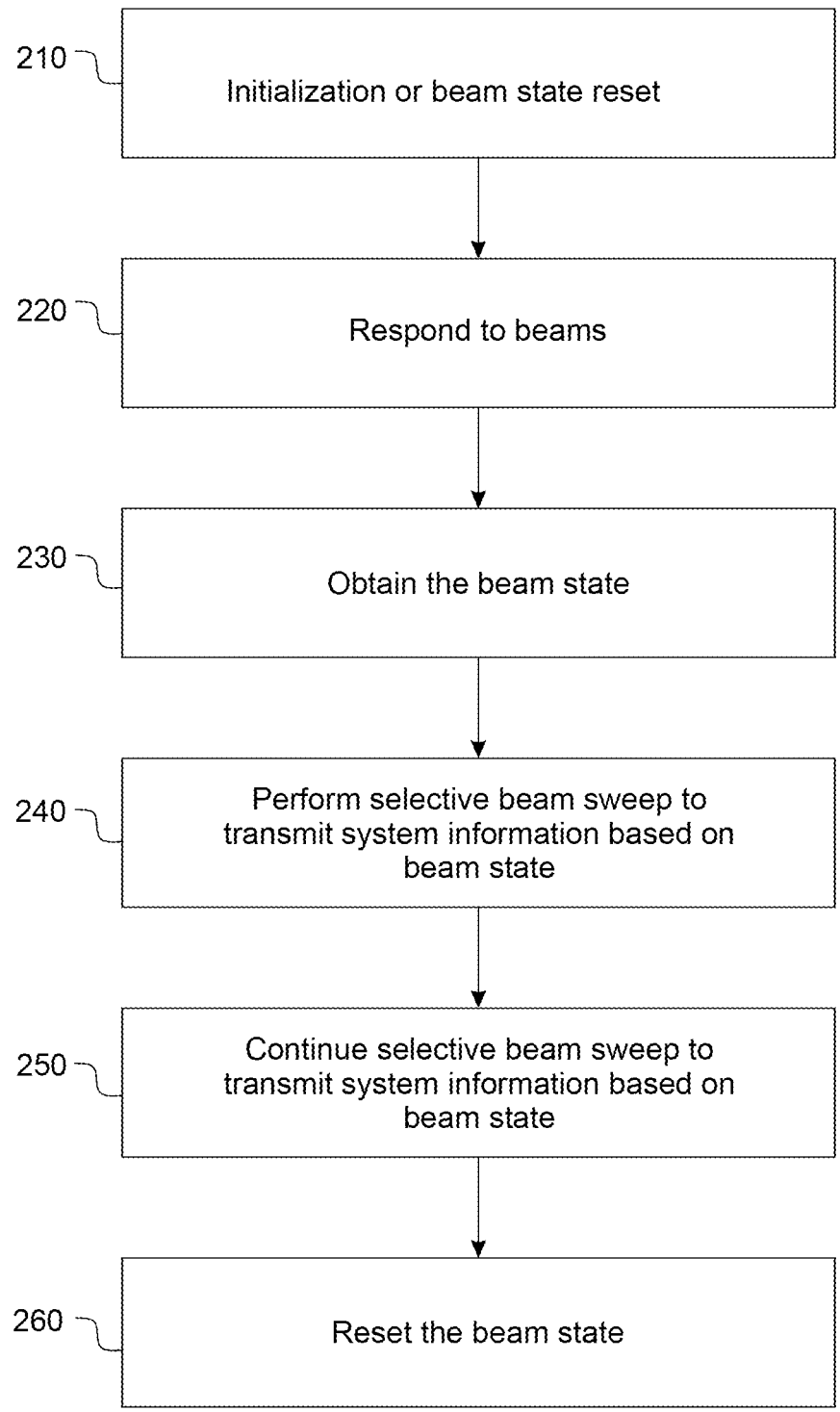
FIG. 2 shows a flow chart diagram of a selective beam sweeping based system information transmission.

FIG. 2 shows a flow chart diagram of a selective beam sweeping based system information transmission. As shown in the diagram 200, a gNB performs initialization or a beam state reset 210. One or more WTRUs then respond to the beams 220 transmitted from the gNB and the gNB obtains beam state information associated with the beams 230. A selective beam sweep is performed by the gNB to transmit system information based on the beam state 240. The gNB continues the selective beam sweep to transmit system information based on the beam state 250. The gNB then resets the beam state 260.

Figure 3:
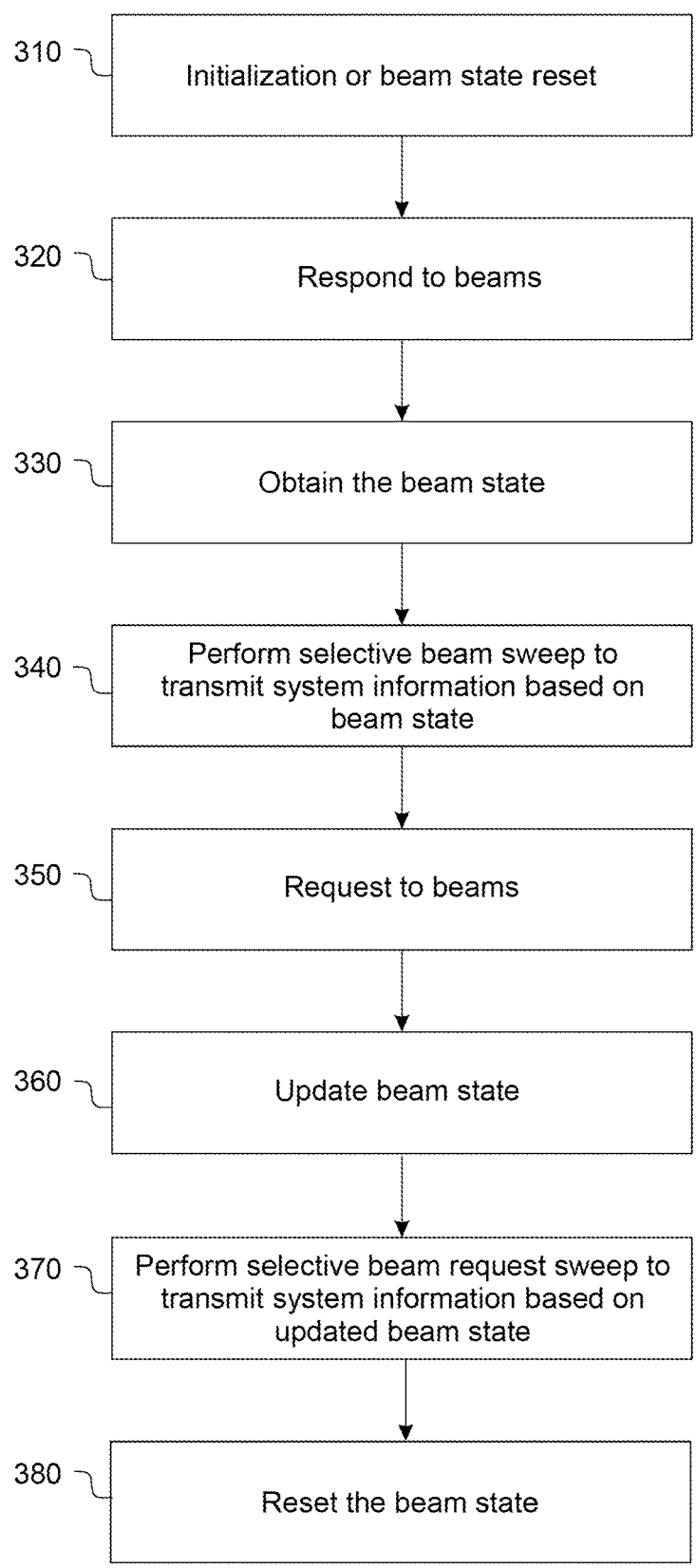
FIG. 3 shows a flow chart diagram of a selective beam sweeping based system information transmission using an updated beam state.

FIG. 3 shows a flow chart diagram of a selective beam sweeping based system information transmission using an updated beam state. As shown in the diagram 300, a gNB performs initialization or a beam state reset 310. One or more WTRUs then respond to the beams 320 transmitted from the gNB and the gNB obtains beam state information associated with the beams 330. The gNB performs a selective beam sweep to transmit system information based on the beam state 340. Next, the WTRU sends a request signal to request beams from gNB 350 and the gNB updates the beam state at gNB 360. A selective beam sweep is performed by the gNB to transmit system information based on the updated beam state at gNB 370. The gNB then resets the beam state 380.

Figure 4:
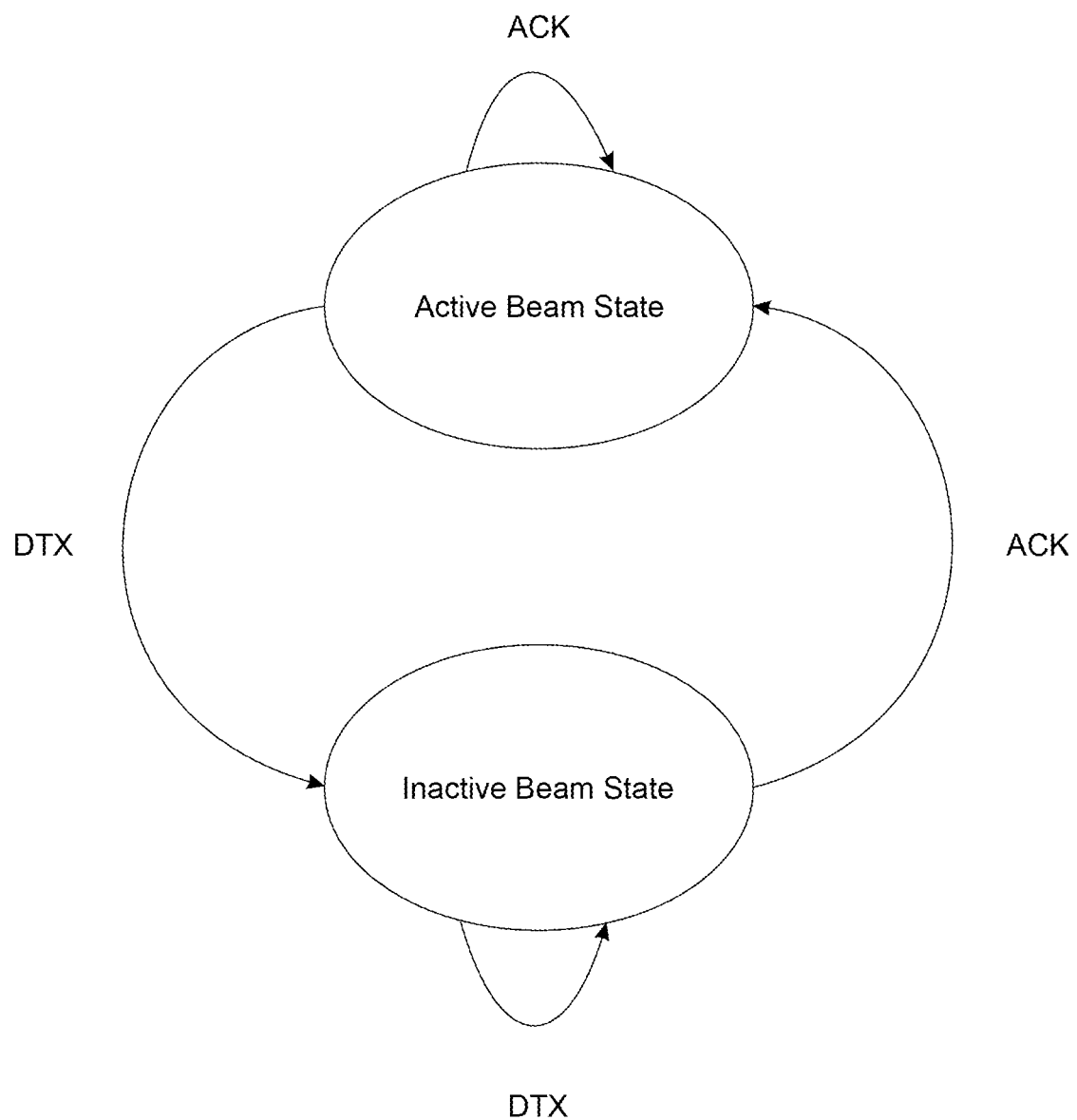
FIG. 4 is a beam state transition table that shows the states of a beam when using selective beam sweeping.

FIG. 4 is a beam state transition table that shows the states of a beam when using selective beam sweeping. In an example, the beam is established between a gNB and a WTRU. As shown in the state transition table 400, a beam in the inactive state may transition to the active state again if the gNB receives an acknowledgement (ACK) from the WTRU. A beam in the inactive state remains in the inactive state if the gNB receives a discontinuous transmission (DTX) indication (hereinafter, DTX) from the WTRU. A beam in the active state may transition to the inactive state in response to a DTX. A beam in the active state remains in the active state in response to an ACK from the WTRU.

In an embodiment, NR systems may use a selective beam sweeping with an aperiodic broadcasting signal. A WTRU may measure one or more signals (e.g., always-on signals such as synchronization signals (e.g., primary and secondary synchronization sequence (PSS and SSS)), a PBCH, a beam-specific reference signal (BRS), always-on SIBs, and the like) associated with one or more beams and the WTRU may determine at least one beam to indicate to a gNB or a transmission reception point (TRP).

For example, a WTRU may measure downlink signals (e.g., beam-specific reference signals or BRSs) associated with one or more beams and the WTRU may determine at least one of the beams to indicate to a gNB. The WTRU may then send or report an indication related to the determined beam and/or required broadcasting information in a certain time location (e.g., subframe n) and the WTRU may start monitoring a downlink control channel for information (e.g., downlink control information (DCI)) within a time window, wherein the time window may be determined, configured, or indicated.

A DCI scrambled with an RNTI for a broadcasting signal (e.g., SI-RNTI) may be monitored in a downlink control channel search space within a time window when there is selective beam sweeping with an aperiodic broadcasting signal. It is noted that any one or a combination of the following may apply.

A DCI scrambled with a RNTI for broadcasting signal (e.g., SI-RNTI) may be monitored in a downlink control channel search space within a time window.

The time window may start from subframe n+k and finish in subframe n+k+s when a WTRU transmits a request indication (or REQ) of beam and/or broadcasting signal in subframe n.

A downlink control channel search space may be a common search space which may be common for all downlink beams or beam-specific search space. For example, one or more beam-specific search spaces may be used and a WTRU may monitor a beam-specific search space which may be associated with the beam indicated or determined for a broadcasting signaling.

The DCI may include beam-related information (e.g., beam-ID), broadcasting signal type (e.g., MIB, SIB, SIB-x), a set of broadcasting signals (e.g., one or more of SIBs), and/or period of broadcasting signal transmission (e.g., 50 TTIs).

The DCI may include scheduling of a PDSCH which may carry one or more broadcasting signals.

The DCI may include a valueTag that indicates the broadcasting signal change status.

A WTRU may monitor the DCI in a common search space if the WTRU is in RRC idle while the WTRU may monitor the DCI in a WTRU-specific search space if the WTRU is in RRC connected.

A DCI without PDSCH scheduling information may carry broadcasting information and its search space (or DL control channel candidate) may be beam-specific when there is selective beam sweeping with an aperiodic broadcasting signal. It is noted that any one or a combination of the following may apply.

One or more DL control channel search spaces may be configured and each DL control channel may be associated with a beam. A WTRU may monitor beam-specific search space within a time window for a broadcasting signal reception.

One or more DL channel candidates may be used and a subset of DL control channel candidates may be associated with a beam. A WTRU may monitor a subset of DL control channel candidates which may be associated with the beam the WTRU reported or indicated.

In another embodiment, a selective beam sweeping may be used with a periodic broadcasting signal for a first set of SIBs and an aperiodic broadcasting signal for a second set of SIBs. For example, a higher priority SIBs (e.g., SIB-1/2) may be transmitted periodically with a selective beam sweeping and a lower priority SIBs (e.g., SIBs other than SIB-1/2) may be transmitted aperiodically with a selective beam sweeping.

A selective beam sweeping for a higher priority SIBs (or a first set of SIBs) may be periodically transmitted and the set of beams for the selective beam sweeping in each period may be determined dynamically while a selective beam sweeping for a lower priority SIBs (or a second set of SIBs) may be aperiodically transmitted and a WTRU may monitor associated DCI during a time window in a beam-specific search space (or DL control candidates). For example, a higher priority SIB may be a MIB and a lower priority SIB may be other SIBs.

In an embodiment, a WTRU may indicate, report, or request a preferred, selected, or determined beam for reception of a broadcasting signal. A WTRU may measure one or more downlink signals for a measurement of a beam quality, a signal strength, a preferred beam, and/or a preferred set of beams and the WTRU may report, request, provide feedback, or indicate one or more beams (e.g., one or more preferred beams or one or more determined beams). The WTRU may then attempt to receive a broadcasting signal based on the one or more beams reported, or indicated. It is noted that any one or a combination of the following may apply.

A WTRU may report a request bit or an indication bit which may be referred to as a beam request signal (or REQ). The terms a beam request signal, feedback, ACK for beam, a beam indication signal, and a beam request indication may be used interchangeably. The beam request signal may be transmitted to a gNB in a common channel or a dedicated channel.

A beam request signal, ACK for beam, a beam indication signal, or a beam request indication reporting may be based on energy or power level of downlink signal associated with a beam. A WTRU may measure a downlink signal associated with a beam and the WTRU may report an ACK for the beam that is above a predefined or predetermined threshold. Otherwise, the WTRU may not send an ACK for the beam (e.g., DTX).

The downlink signal associated with a beam may be at least one of a BRS, a subset of broadcasting signal (e.g., MIB), an essential part of broadcasting signal (e.g., SIB-1), or the like.

When a beam is ACKed, the beam is in an active state which may imply that there is a WTRU residing in the beam, otherwise the beam is in an inactive state. The selective beam sweeping may be performed only on those beams in the active state.

DTX may imply that a WTRU may be not present in the beam or that the WTRU is out of the coverage of the beam.

A beam may be in the active state if an ACK is received by the gNB or if an ACK is transmitted by the WTRU. A beam may be in the inactive state if a DTX is detected by the gNB or no ACK is signaled by the WTRU.

In another embodiment, a first part of a broadcasting signal may be transmitted periodically with full beam sweeping and a second part of the broadcasting signal may be transmitted on-demand with selective beam sweeping. A WTRU may report beam request indication based on the reception of the first part of the broadcasting signal to activate the beam associated with the second part of the broadcasting signal. It is noted that any one or a combination of the following may apply.

A first part of a broadcasting signal may include at least one of a MIB, a SIB1, and a SIB2.

A second part of the broadcasting signal may include all SIBs other than the SIBs in the first part of the broadcasting signal.

A WTRU may receive a first part of a broadcasting signal with all beams which may be swept in each period. The WTRU may assume that the same broadcasting signal is repetitively transmitted in all beams swept in the period, and the WTRU may combine the received signals from one or more beams at the receiver.

During the reception of the first part of a broadcasting signal, a WTRU may determine one or more beams (or one or more preferred beams) for the second part of the broadcasting signal and the WTRU may report the determined beam or beams and/or request the second part of the broadcasting signal, wherein the second part of the broadcasting signal may include a set of SIBs or one or more subsequent SIBs.

A first part of a broadcasting signal may include any one or a combination of the following information: a number of beams used for the broadcasting signal (e.g., single beam or multiple beams); uplink resources to use for a determined beam indication (or reporting) and/or a request of a second part of the broadcasting signal; and a time/frequency resource configuration or allocation for the second part of the broadcasting signal. It is noted that any one or a combination of the following may apply.

Separate uplink resources may be configured for one or more SIBs in the second part of the broadcasting signal.

One or more groups may be configured or used for the second part of the broadcasting signal and each group may have an associated uplink resource to indicate. For example, if two groups of broadcasting signal are used, the first group (e.g., SIB-3~SIB-7) may have its associated uplink resource and the second group (e.g., SIB-7~SIB-12) may have another uplink resource to indicate.

The time/frequency resource may be configured separately for each beam in the second part of the broadcasting signal.

The periodicity of the first part of the broadcasting signal may be indicated from a synchronization signal.

In another embodiment, a WTRU may receive, attempt to receive, or monitor a downlink signal which may indicate a transmission of broadcasting signal in a certain beam. The terms a downlink signal that indicates a transmission of broadcasting signal in a certain beam, a beam activation signal, a beam activation indication, a confirmation of ACK indication, and an ACK-to-ACK signal may be interchangeably. It is noted that any one or a combination of the following may apply.

One or more downlink signals may be reserved in a predefined time/frequency resource or a preconfigured control channel resource and the one or more downlink signals may be used for a beam activation indication. For example, one or more downlink signals may be associated with one or more beam request indications and a gNB may use an associated downlink signal for beam activation indication if the gNB received beam request indication.

The number of beam activation indication resources may be determined based on the number of beam request indication resources. For example, the number of beam activation indication resources may be the same as the number of beam request indication resources. A WTRU may receive, attempt to receive, or monitor an associated beam activation resource after sending or transmitting a beam request indication. A beam activation indication may be signaled via at least one of a higher layer signaling, a DCI, and a HARQ-ACK resource for an uplink signal (e.g., PHICH).

A WTRU may determine a beam active status based on a signal strength of a certain time/frequency resource. For example, if a received signal strength of a first time/frequency/sequence resource is higher than a predefined threshold, a WTRU may assume that the associated beam is active. Otherwise, the WTRU may assume that the associated beam is inactive. It is also noted that one or more time/frequency/sequence resources may be preconfigured for one or more beams used, and a WTRU may detect or monitor the received signal strength for the preconfigured resources to determine the beam activation status.

A common control channel may be used to indicate a set of beams which may be active for a time period.

The WTRU uses the downlink signal in order to minimize the number of beams used to transmit the always-on signal for the beam sweep. Accordingly, WTRU direction information may be needed, an energy-based ACK reporting scheme may be implemented, and selective beam sweeping may be used.

The direction information or beam information of a WTRU may need to be known in order to enable selective beam sweep for system information. An ACK reporting scheme may be implemented in order to determine the direction information or beam information of a WTRU. The ACK reporting scheme may be based on an energy or power level. The energy of power level may be measured via a BRS or the like. For example, when a WTRU detects energy for a beam that is above a predetermined threshold, the WTRU may report an ACK. Otherwise, the WTRU may report a DTX. As described above, a DTX may imply that a WTRU is not present in the beam or that the WTRU is out of the coverage of the beam.

When the WTRU reports an ACK and the beam is ACKed, the beam the beam goes to an active state indicating that there is a WTRU residing in the beam. If the WTRU does not report an ACK and the beam is not ACKed, the beam goes to an inactive state. As described above, selective beam sweeping is only performed on beams in the active state.

All beams are associated with a beam state. It is assumed that an initial beam state for each beam is the active state. The state of a beam remains the same between resets. The initial beam state may be reset ever N TTIs. A beam state may be obtained during a reporting period. During the reporting period, a WTRU may report an ACK responding to a beam if the energy or power measured in a BRS or the like for the beam is above a predetermined threshold. The WTRU may measure one or more signals (e.g., one or more always-on signals, such as synchronization (e.g., PSS, SSS), PBCH, BRS, always-on SIBs, and the like) associated with one or more beams and the WTRU may determine at least one beam to indicate to a gNB or a TRP. Otherwise, the WTRU may report a DTX.

A gNB or a TRP determines that a beam is in an active state if an ACK is received. The gNB or the TRP determines that a beam is in an inactive state if a DTX is detected.

During a beam sweep period, a gNB or a TRP may transmit system information in active beams. The gNB or the TRP may also turn off beams for inactive beams during the beam sweep period.

Non-essential system information may be transmitted using a beam-specific common control channel. System information transmission overhead may be high using WTRU common signaling in all directions and all beams due to the amount of beam sweeping that may be required to cover entire service areas. This transmission overhead may also cause high latency or delay.

In an embodiment, a selective beam sweep is used to deliver non-essential system information according to direction information or beam information of one or more WTRUs. Because one or more directions or beams may not have a WTRU residing in the beam, only selective beams are used by a gNB or a TRP for sweeping to deliver non-essential system information. For example, a NR-PDCCH with a NR-SI-RNTI may be used to schedule a NR-PDSCH for those beams. The system information may then be transmitted by the gNB or the TRP using a selective beam request transmission.

As described above, it is assumed that the initial beam state of all beams is the active state. The initial beam state may be reset every N TTIs. Between resets, a beam state transition process may occur. An energy-based ACK reporting scheme may provide beam state transitions for beams. Then, beam request sweeping may be performed accordingly.

During a reporting period, a WTRU may report an ACK responding to a beam if the energy or power measured in a BRS or the like for the beam is above a predetermined threshold and the beam is in active state. During the reporting period, the WTRU may report an ACK to request a beam if the beam is in inactive state. During a reporting period, the WTRU may measure on one or more signals (e.g., one or more always-on signals such as synchronization (e.g., PSS, SSS), PBCH, BRS, always-on SIB, and the like) associated with one or more beams and the WTRU may determine at least one of the beams to indicate to a gNB or a TRP. Otherwise, the WTRU may report a DTX.

During a beam sweep period, the gNB or the TRP may maintain a beam in the active state if at least one ACK is received from WTRUs in the beam. The gNB or the TRP may turn a beam into the active state if at least one ACK (as requested) is received from one or more WTRUs in the beam. The gNB or the TRP may turn a beam into the inactive state if a DTX is detected for all WTRUs in the beam.

A gNB or a TRP may use a single beam mode or a multiple beam mode for a system information transmission. A WTRU may receive the beam mode (e.g., single beam mode or multiple beam mode) before receiving the system information (e.g., via synchronization signal and/or initial broadcasting signal including a MIB).

In an embodiment, WTRU procedures for supporting on-demand system information transmission may be determined based on a single beam mode or a multiple beam mode. There exists a need to turn a periodic system information transmission into an aperiodic transmission via a request or request command (REQ) from a WTRU. A gBN or a TRP then transmits system information in a system information transmission to the WTRU. The system information transmission may also be referred to as a SIB transmission. If a WTRU correctly receives the system information, the system information may not need to be transmitted again until a next request from the WTRU.

For example, a WTRU may request system information via a common channel. A beam-specific common control may be used for system information transmission. Here, system information requested by a WTRU may also be shared with other WTRUs in the same beam. The beam may be a single beam or a beam in multi-beam system. In a single beam system, system information requested by a WTRU may also be shared by other WTRUs in the same TRP or cell in the single beam system. In a multi-beam system, this is referred to as a beam-specific request method.

In another example, a WTRU may request system information via a dedicated channel. A beam-specific dedicated control may be used for a system information transmission. Here, system information requested by a WTRU may not be shared by other WTRUs.

The WTRU procedures for supporting on-demand system information transmission may also support a request-based and a cyclic redundancy check (CRC)-based ACK reporting scheme.

When a single beam mode is used for a system information transmission, a WTRU may decode one or more SIBs in a SIB transmission (TX) opportunity time symbol (or a SIB TX period). The WTRU may generate an ACK if detection of the one or more SIBs is successful; otherwise, the WTRU generates an NACK. The WTRU sends the ACK or NACK based on the detection status. The WTRU may also send a DTX for a TRP or a cell may be turned on/off and enter an inactive or active state.

When a multiple beam mode is used for a system information transmission, a WTRU may decode one or more SIBs in a SIB TX opportunity time symbol (or a SIB TX period) associated with a beam (e.g., a beam-specific SIB TX period). The WTRU may generate an ACK if detection of the one or more SIBs in a beam is successful; otherwise, the WTRU may generate NACK. The WTRU may send the ACK or NACK in a resource which may be associated with the beam based on the detection status. The WTRU may also send a DTX for a beam or beams to be turned on/off and enter an inactive or active state.

A gNB may stop transmitting system information (or system information in a specific beam) if an ACK is detected, and a WTRU may assume or it may be indicated that the gNB stops transmitting system information (or system information in a specific beam).

A gNB may retransmit system information (or system information in a specific beam) if an NACK is detected, and a WTRU may assume, expect, or attempt to receive the retransmission of system information (or system information in a specific beam) if the WTRU send a NACK.

Figure 5:
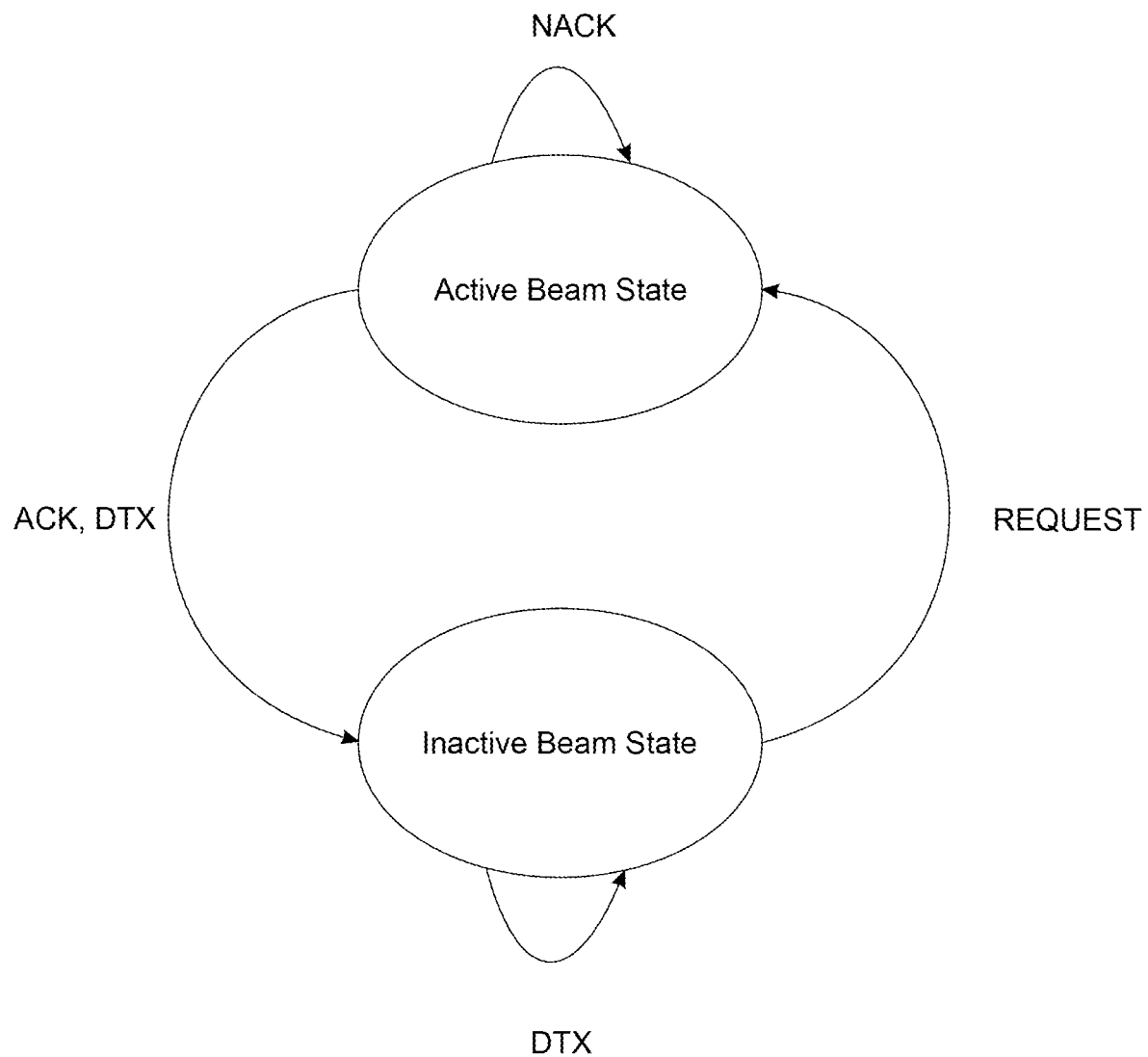
FIG. 5 is a beam state transition table that shows the states of a beam based on a data detection state.

FIG. 5 is a beam state transition table that shows the states of a beam based on a data detection state. After an initial beam state is set, a beam state transition may occur if a gNB receives a SIB request from a WTRU. A beam transition may also occur in response to a data detection state of a SIB for one or more WTRUs. The data detection state may produce an ACK or a NACK. The data detection state may be based on a CRC test. The data detection state may be a pass or a fail.

As shown in FIG. 5, a beam in the inactive state may transition to the active state again if a gNB receives a SIB request from a WTRU. A beam in the inactive state remains in the inactive state if a DTX is detected. A beam in the active state may transition to the inactive state due to a CRC-based ACK. A beam in the active state may transition to the inactive state if a DTX is detected. A beam in the active state may remain in the active state due to a CRC-based NACK.

Figure 6:
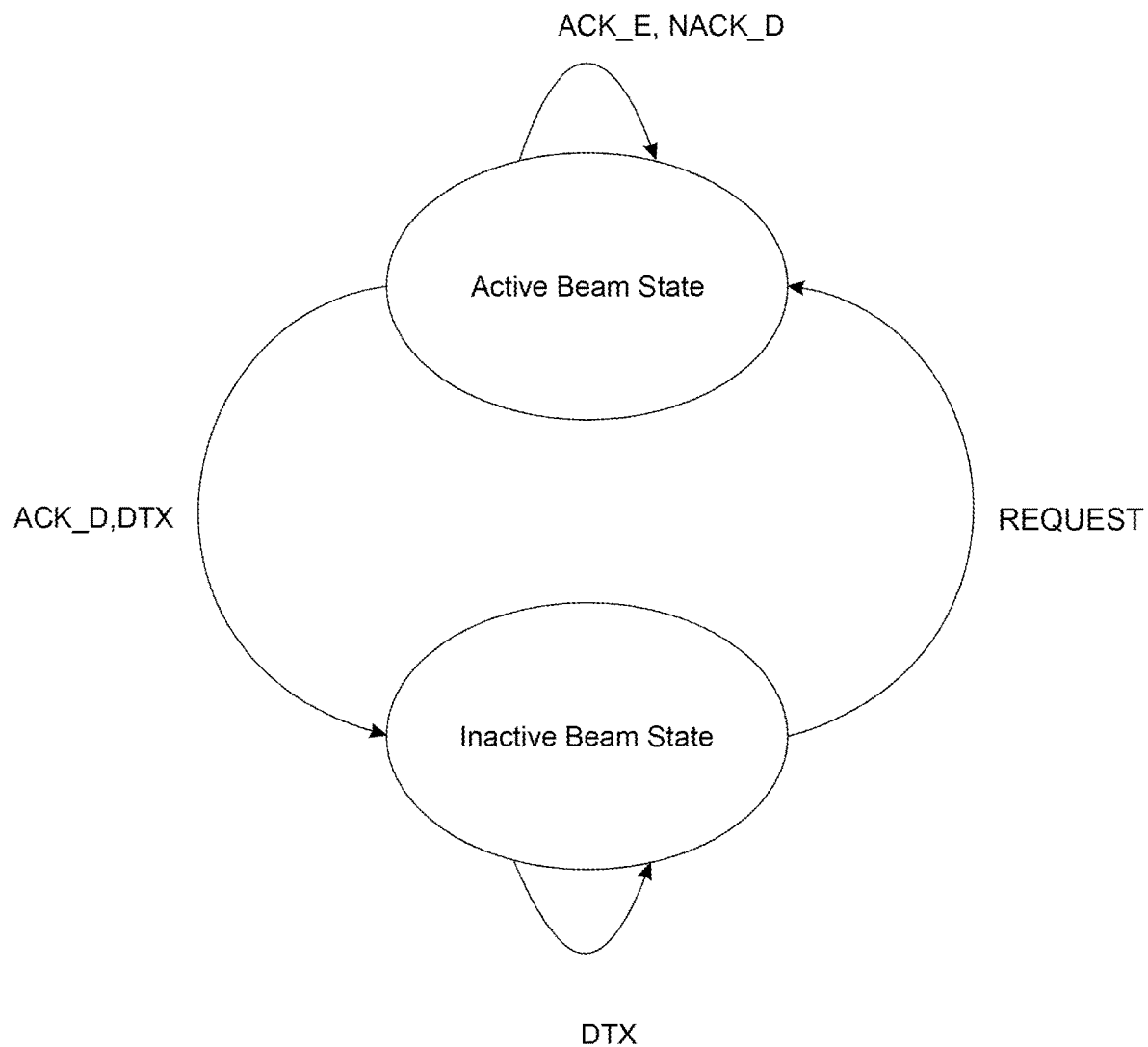
FIG. 6 is a beam state transition table that shows the states of a beam based on based on a data detection state and energy.

FIG. 6 is a beam state transition table that shows the states of a beam based on based on a data detection state and energy. As shown in FIG. 6, a beam in the inactive state may transition to the active state if a gNB receives a SIB request from a WTRU. A beam in the inactive state remains in the inactive state if a DTX is detected. A beam in the active state may transition to the inactive state due to energy falling below a predetermined threshold. For example, a beam in the active state may transition to the inactive state due to WTRU DTX for the measured power or due to signal strength on a BRS (or the like) is lower than a predetermined threshold. A base in the active state may transition to the inactive state due to a CRC-based ACK (ACK_D) or if a DTX is detected. A beam in the active state may remain in the active state due to a CRC-based NACK (NACK_D) or an energy based ACK (ACK_E).

Figure 7:
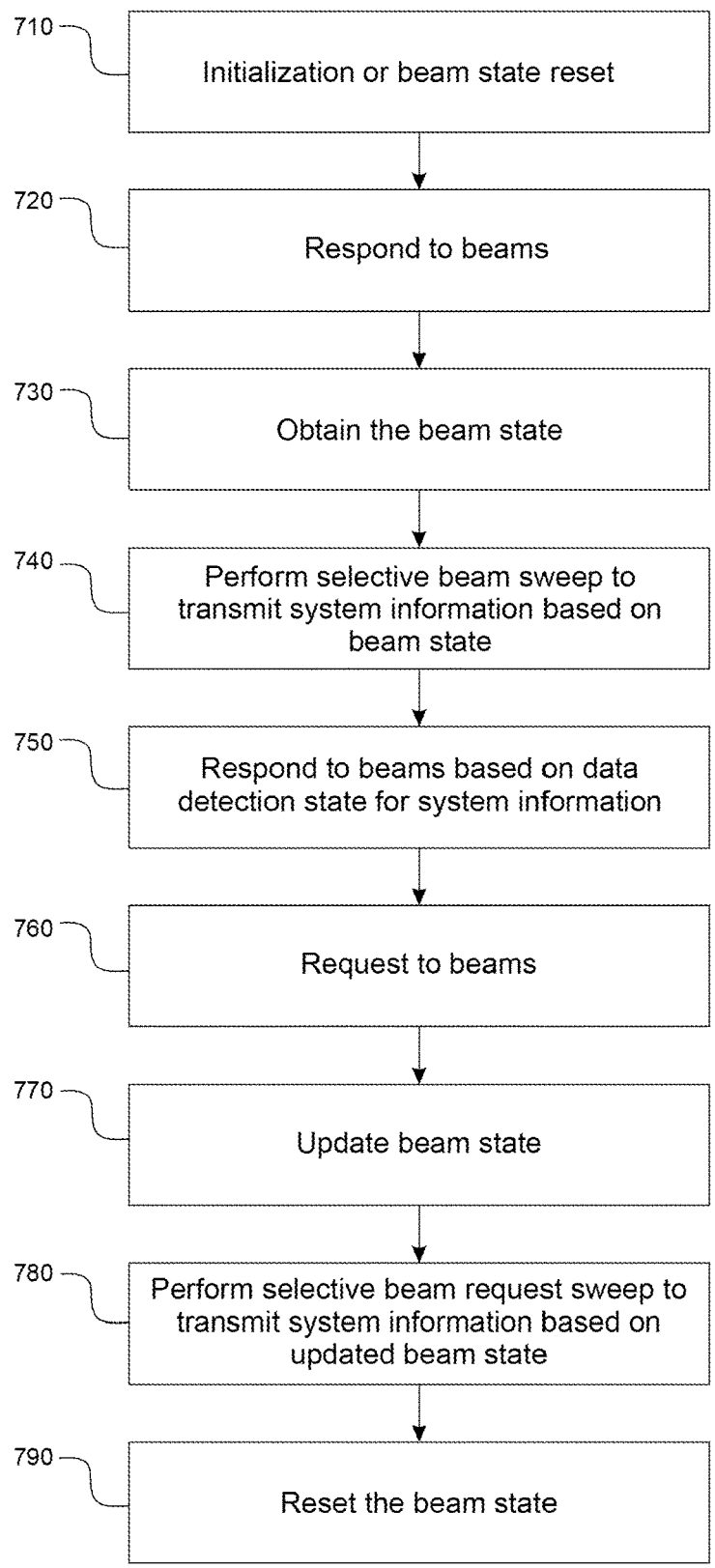
FIG. 7 shows a flow chart diagram of a selective beam sweeping based system information transmission based on a data detection state and energy of a WTRU.

FIG. 7 shows a flow chart diagram of a selective beam sweeping based system information transmission based on a data detection state and energy of a WTRU. As shown in the diagram 700, a gNB performs initialization or a beam state reset 710. One or more WTRUs then respond to the beams transmitted from the gNB 720 and the gNB obtains beam state information associated with the beams 730. The gNB performs a selective beam sweep to transmit system information based on the beam state 740. The one or more WTRUs then respond to the beams transmitted from the gNB based on a data detection state of system information of the one or more WTRUs 750. Next, the one or more WTRUs sends a request signal to request beams to be transmitted from the gNB 760 and the gNB updates the beam state 770 based on the one or more request signals received from the one or more WTRUs. A selective beam sweep is performed by the gNB to transmit system information based on the updated beam state 780. The gNB then resets the beam state 790.

For a beam state transition based on energy, a DTX being detected implies that the WTRU is not present. For a beam state transition based on a data detection state and energy, a DTX being detected implies that the WTRU is not present or that the WTRU is present but did not request a SIB transmission or system information in the beam.

As described above, a WTRU may send an ACK to acknowledge the receipt of a SIB transmission. For example, if a gNB receives an ACK in a beam, it implies that there is at least one WTRU in that beam. If an ACK is not received, a gNB may assume that there is no WTRU in the beam and a selective beam sweep may exclude that beam from a beam sweep.

Figure 8:
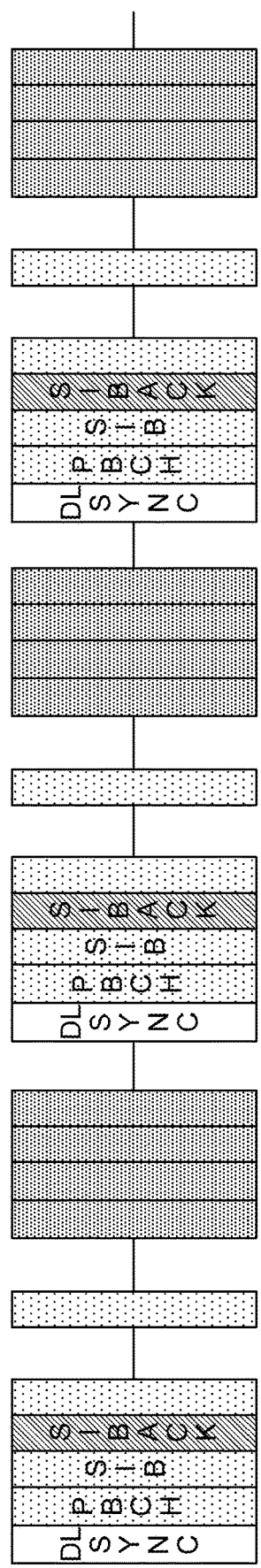
FIG. 8 shows a timing diagram of ACK to SIB process used for SIB transmissions.

FIG. 8 shows a timing diagram of ACK to SIB process used for SIB transmissions. As shown in FIG. 8, a WTRU receives and measure one or more DL synchronization signals, a PBCH, and a SIB transmission. The WTRU may then send an ACK in response to a SIB transmission.

An energy-based ACK to a SIB transmission may be used to build the directional profile of a WTRU during an initial state. During a beam state transition, sending an ACK to a SIB transmission may be used to track the directional profile of a WTRU. For example, if a CRC-based ACK is received, then the one or more beams participating in the beam sweep may stop the SIB transmission. The beam may change from the active beam state to an inactive beam state in the next beam sweep. If at least one NACK is received, then the SIB transmission is sent again for that beam. If a beam becomes silent and a DTX is detected due to no WTRU being present in the beam, the active beam may transition to the inactive state for the next beam sweep.

For those beams not participating in the beam sweep, if a REQ is received, the gNB starts sending a SIB transmission again. Therefore, an ACK and a DTX may transition a beam in the active state to the inactive state. A NACK may keep a beam in the active state still active. While a REQ may transition a beam in the inactive state to the active state for a next beam sweep. A gNB may receive any one or a combination of an ACK, NACK, DTX, and REQ in a corresponding time symbol for a beam.

In an embodiment, WTRU procedures supporting a beam-specific request for a SIB transmission are used to minimize an always-on signal. In a beam-specific request for a SIB transmission, a WTRU may request a SIB or SIBs via the beam in which the WTRU resides. When a WTRU requires a SIB or SIBs, the WTRU may perform non-autonomous HARQ processes for the SIB or SIBs to initiate a request for a SIB transmission.

Figure 9:
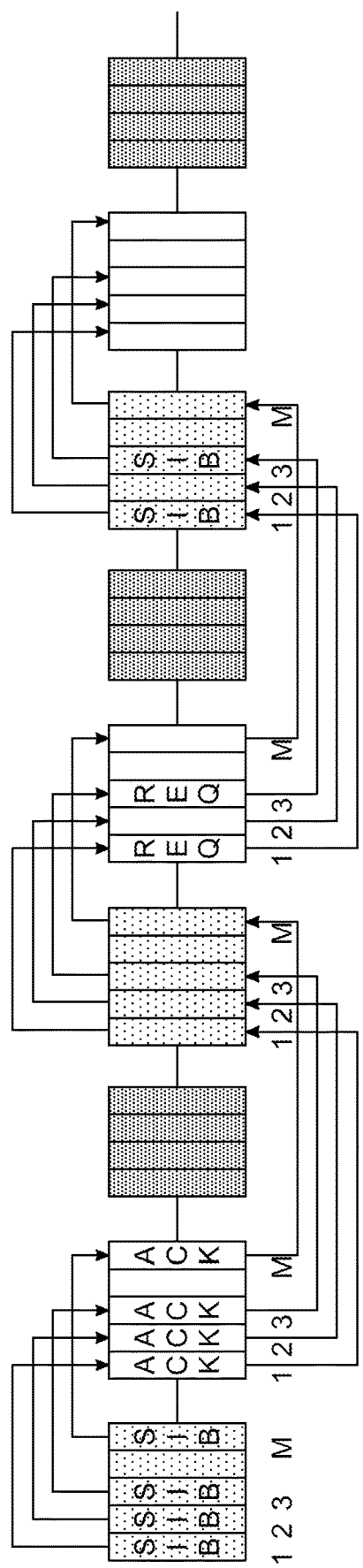
FIG. 9 shows a timing diagram of an example non-autonomous HARQ process used for SIB transmissions.

In an embodiment, a WTRU may use non-autonomous HARQ processes to request a SIB transmission. FIG. 9 shows a timing diagram of an example non-autonomous HARQ process used for SIB transmissions. In FIG. 9, a SIB transmission may first be transmitted in all directions and in all beams (e.g., beams 1, 2, 3 . . . M) at time symbols 1, 2, 3 . . . M, respectively. When a WTRU detects a SIB transmission, the WTRU may report an ACK to a gNB. One or more WTRUs may try to detect a SIB transmission in all beams and in all directions. It is noted that WTRUs in different beams may report ACKs back to the gNB. When an ACK is received by the gNB or a TRP, the SIB transmission may be stopped because the one or more WTRUs may have already received the system information. FIG. 9 shows that beams 1, 2, 3 . . . M are all ACKed in a next transmission time opportunity. All beams may not transmit a SIB transmission or SIBs.

A WTRU may request a SIB transmission when needed. The WTRU may send a REQ to a gNB or a TRP for a beam that corresponds with the location of the WTRU. As shown in FIG. 9, one or more WTRUs may send a REQ for a SIB to a gNB for beams 1 and 3. The gNB then receives the REQs from the WTRUs and the SIB is transmitted in the corresponding beams (i.e., beams 1 and 3) in a next transmission opportunity.

Figure 10:
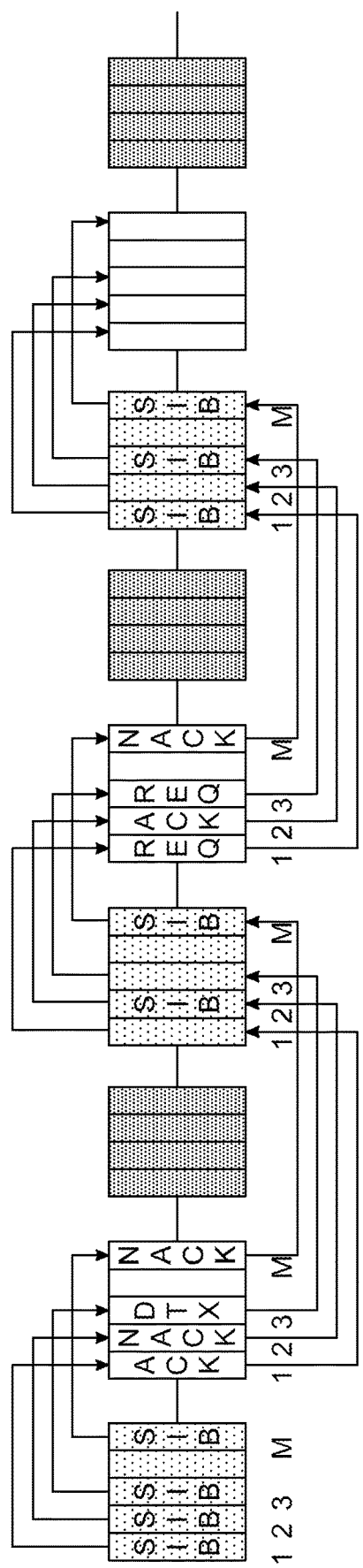
FIG. 10 shows a timing diagram of another example non-autonomous HARQ process used for requesting SIB transmissions.

FIG. 10 shows a timing diagram of another example non-autonomous HARQ process used for requesting SIB transmissions. In FIG. 10, a SIB transmission is first transmitted in all directions and in all beams (e.g., beams 1, 2, 3 . . . M) at time symbols 1, 2, 3 . . . M, respectively. When a WTRU detects a SIB transmission, the WTRU may report an ACK to a gNB. One or more WTRUs may detect a SIB transmission in all beams and all directions. WTRUs in different beams may report ACKs back to the gNB. For those beams that have been ACKed, the gNB or the TRP may stop the SIB transmission because the one or more WTRUs may have already received the system information. When a WTRU does not detect a SIB transmission for a certain beam, the WTRU may either NACK or DTX for that beam and the SIB transmission may continue in that beam because the one or more WTRUs may have not received the system information. A WTRU may request a SIB transmission when needed.

In an embodiment, a WTRU may use a combined CRC-based and energy-based method for performing non-autonomous HARQ processes to request a SIB transmission. In this embodiment, energy or power may be measured via a beam-specific reference signal (BRS). If detected energy is above a predetermined threshold but a CRC test does not pass, a WTRU may report a NACK. The NACK may provide an indication that the detected energy of one or more beams is above a predetermined threshold but a CRC test does not pass for one or more beams. Accordingly, a gNB may then retransmit the SIB transmission or system information. A NACK used in this manner may be referred to as an intelligent NACK. A WTRU may report a DTX if detected energy is below a predetermined threshold. A DTX may also indicate that there is not a WTRU residing in a beam. A WTRU may report an ACK if detected energy is above a predetermined threshold and CRC passes.

In an embodiment, a WTRU may use an energy-based method for performing non-autonomous HARQ processes to request a SIB transmission. Similar to the embodiment described above, energy or power may be measured via a BRS. If detected energy is above a predetermined threshold, a WTRU may report an ACK. A WTRU may report a DTX if detected energy is below a predetermined threshold.

In FIG. 10, beam 1 is ACKed in a next transmission time opportunity. FIG. 10 also shows that one or more WTRUs do not detect a SIB transmission for beams 2 and M. The one or more WTRUs then report an NACK for beams 2 and M. The SIB transmission continues in beams 2 and M since the one or more WTRUs may have not received the system information. For beam 3, the one or more WTRUs do not detect a SIB transmission for beam 3 and the one or more WTRUs may report a DTX for beam 3. Alternatively, the gNB or the TRP may continue transmitting the SIB transmission for a preset timer before stopping transmission of the SIB. As a result, the gNB or the TRP may continue the SIB transmission in beams 2 and M but the SIB transmission is stopped in beam 3.

In a next uplink time opportunity, a WTRU may request system information when needed. The WTRU may send a REQ to the gNB for the corresponding beam in which it resides. As shown in FIG. 10, one or more WTRUs may send REQs to the gNB via beams 1 and 3. When the gNB receives these requests or REQs from the one or more WTRUs, SIB transmission are made in the corresponding beams (i.e., beams 1 and 3) in a next SIB transmission time opportunity. In FIG. 10, because beam 2 has been ACKed, a SIB may not be transmitted in a next SIB transmission time opportunity. Beam M has been NACKed and a SIB may be transmitted again in beam M in a next SIB transmission time opportunity. As a result, the gNB or the TRP may continue the SIB transmission in beams 1 and 3 due to a request from the one or more WTRUs and continue the SIB transmission in beam M due to beam M having been NACKed. The gNB or the TRP may stop the SIB transmission in beam 2 due to beam 2 having been ACKed.

A timer may be set for a SIB transmission when a gNB detects a DTX because a DTX may imply that there is no WTRU in the beam. A NACK response may imply SIB is not received correctly but there is a WTRU in that beam. A timer may also be set for SIB when a gNB detects a NACK response. Since energy may be above the threshold but data cannot be decoded correctly, it may imply that there is no WTRU is residing in the beam and the energy may come from interference or noise. If the timer expires, the gNB may stop the SIB transmission.

When a gNB receives feedback from a WTRU for a given beam, the gNB may receive all ACKs from all WTRUs in the beam. The gNB may stop a SIB transmission. When the gNB receives at least one NACK response from a WTRU in that beam, the gNB may continue to a SIB transmission since some of WTRUs may not receive the SIB transmission.

As described above, the WTRU may send an ACK to indicate a WTRU beam location. In an embodiment, the ACK may carry information in addition to acknowledging the beam location of the WTRU. The information carried in the ACK may be used to request a next SIB transmission. More particularly, the WTRU may send an ACK to indicate whether one or more SIBs should be transmitted next time based on a WTRU request. The ACK sent from the WTRU may also indicate how many SIBs should be transmitted next time based on a WTRU request. The WTRU may also indicate the time duration before SIBs should be transmitted next time.

A next SIB transmission may be requested using an ACK after L time intervals of SIB transmissions for a given beam. A BPSK modulated ACK may carry 1 bit to indicate L time intervals of SIB transmissions. For example, L may be L={1, 4} or L={1, 8}. It is noted that other value sets for L are possible. A QPSK modulated ACK may carry 2 bits to indicate L time intervals of SIB transmissions. For example, L may be L={1, 2, 3, 4} or L={2, 4, 6, 8}. It is noted that other value set for L may be possible.

Figure 11:
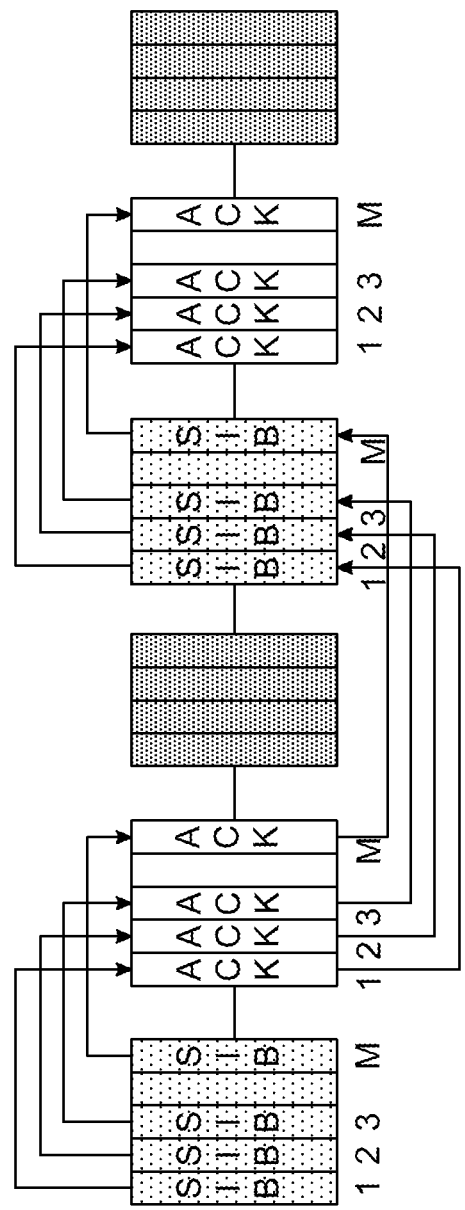
FIG. 11 shows a timing diagram of an example of an ACK that is used to request a next SIB transmission.

FIG. 11 shows a timing diagram of an example of an ACK that is used to request a next SIB transmission. As shown in FIG. 11, an ACK may be used to request a next SIB transmission during HARQ processing. In FIG. 11, a SIB transmission is first transmitted in all directions and in all beams (i.e., beams 1, 2, 3, . . . , M) at time symbols 1, 2, 3 . . . M, respectively. When WTRUs are present in all beams, a gNB may receive ACKs for all beams. The WTRU may use an ACK which may carry additional request information to request a next SIB transmission for WTRU to receive an additional SIB.

Figure 12:
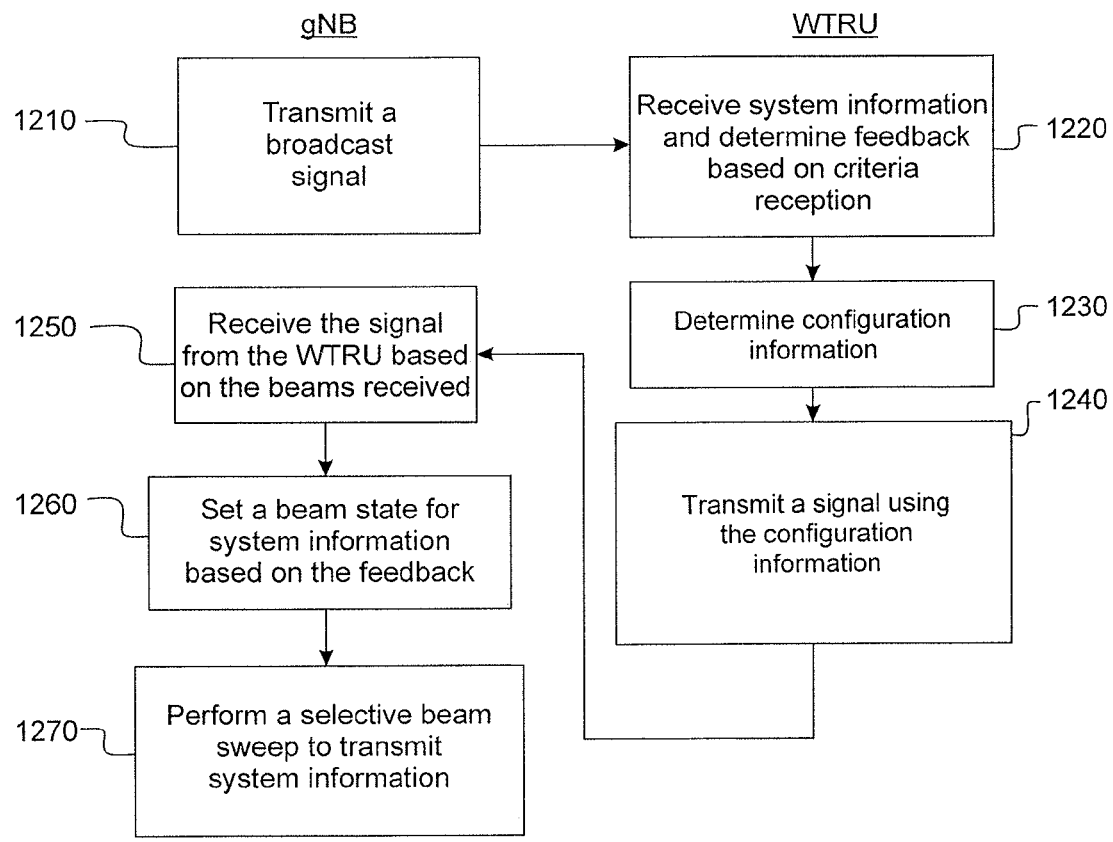
FIG. 12 shows a flow chart diagram of an example of method for use in a gNB and one or more WTRUs for signaling system information in order to enable efficient beam sweeping.

FIG. 12 shows a flow chart diagram of an example of method for use in a gNB and one or more WTRUs for signaling system information in order to enable efficient beam sweeping.

As described above and in diagram 1200, a gNB transmits a broadcast signal including system information 1210. The broadcast signal may be transmitted in one or more directional beams. The broadcast signal may be an always-on signal. The broadcast signal may be transmitted over a PBCH or a similar channel. The broadcast signal may also be transmitted over a channel carrying remaining minimum system information. The system information included in the broadcast signal may provide configuration information, which includes any one or a combination of a resource allocation, mapping information, a resource indication, and a mode indication directing the behavior of the WTRU. The configuration information may include an indication regarding whether the WTRU is able to transmit any one or a combination of a request signal, a feedback signal, or neither to the gNB. The configuration information may allow the WTRU to provide feedback associated with the system information. The configuration information may be part of RACH configuration or different from RACH configuration. The configuration information may be carried or included in broadcast signal or channel, such as a synchronization signal (SS), remaining minimum system information (RMSI), a NR-PBCH, or other system information (OSI). The system information may be referred to as first system information or remaining minimum system information.

A WTRU receives the system information in the broadcast signal and determines whether the received system information satisfies reception criteria 1220. The reception criteria may include any one or a combination of the following: the WTRU successfully receiving a CRC of the system information or the WTRU determining that the energy of a beam is above a threshold.

The WTRU determines configuration information using the broadcast signal in order to provide feedback associated with the system information included in the one or more directional beams 1230. The WTRU then transmits a signal on the one or more beams using the configuration information associated with the received system information 1240. The transmitted signal may be a feedback signal that provides feedback associated with the system information included in the one or more directional beams. The feedback may be transmitted for each of the one or more directional beams. The feedback provided in the transmitted signal may include any one or a combination of beam information associated with the WTRU and an indication regarding whether the received system information satisfies reception criteria.

The gNB receives the signal from the WTRU for each of the one or more directional beams 1250 and the gNB then sets a beam state for a system information transmission based on the feedback included in the transmitted signal 1260. The beam state may be an active state or an inactive state.

The gNB then performs a selective beam sweep to transmit the system information 1270. The selective beam sweep to transmit the system information may be based on any one or a combination of the feedback included in the transmitted signal and the beam state. The transmitted system information may be referred to as second system information or other system information transmissions (SIBs).

In an embodiment, a feedback signal (e.g., ACK and DTX) for an initial beam state may use a fixed preamble sequence. For example, an ACK is generated by a WTRU if such a preamble is detected. Otherwise, a DTX is detected.

In an embodiment, a feedback signal (e.g., ACK and NACK) for a beam state transition uses fixed preamble sequences. Three fixed preamble sequences may be used for an ACK, a NACK, and a REQ. For example, when a WTRU reports an ACK, the WTRU may transmit preamble sequence 1. When a WTRU reports an NACK, the WTRU may transmit preamble sequence 2. When a WTRU sends a REQ, the WTRU may transmit preamble sequence 3. Otherwise, a DTX is detected.

When a gNB receives the corresponding preamble sequence, the gNB may know whether to transmit a SIB. For example, if the gNB receives only preamble sequence 1 for a given beam, the gNB may stop a SIB transmission for that beam. If the gNB receives preamble sequence 2 or preamble sequence 3, the gNB may continue or start the SIB transmission for that beam.

In an embodiment, a feedback signal for a beam state transition uses preamble groups. Three fixed preamble groups may be used for an ACK, a NACK and a REQ. For example, when a WTRU reports an ACK, the WTRU may transmit preamble group 1. When a WTRU reports an NACK, the WTRU may transmit preamble group 2. When a WTRU sends a request command (REQ), the WTRU may transmit preamble group 3. Otherwise, a DTX is detected.

When a WTRU reports an ACK, the WTRU may select a preamble sequence from preamble group 1. When a WTRU reports an NACK, the WTRU may select a preamble sequence from preamble group 2. When a WTRU sends a REQ, the WTRU may select a preamble sequence from preamble group 3.

In an embodiment, a feedback signal for a beam state transition uses reduced preamble sequences where two preamble sequences are used for ACK and REQ. For example, when a WTRU reports an ACK, the WTRU may transmit preamble sequence 1. When a WTRU sends a REQ, the WTRU may transmit preamble sequence 2. Otherwise, a DTX is detected.

When a WTRU reports an ACK, the WTRU may transmit preamble sequence 1. When a WTRU sends a REQ, the WTRU may transmit preamble sequence 2.

When a gNB receives the corresponding preamble sequence, the gNB may know whether to transmit a SIB. For example, if a gNB receives only a preamble sequence 1 for a given beam, the gNB may stop the SIB transmission for that beam. If a gNB receives a preamble sequence 2, the gNB may continue the transmission of SIB for that beam regardless of whether it receives preamble 1 or not. If at least one WTRU in a given beam requests a SIB, the gNB may transmit a SIB in that beam. The WTRUs in that beam that already received the SIB may not be required to decode the SIB.

In an embodiment, a feedback signal for a beam state transition uses reduced preamble sequences where two preamble sequences are used for an ACK, a NACK, and a REQ. For example, when a WTRU reports an ACK, the WTRU may transmit preamble sequence 1. When a WTRU reports an ACK or sends a REQ, the WTRU may transmit preamble sequence 2. Because a NACK is used for the active state and a REQ is used for the inactive state, there is no ambiguity. Otherwise, a DTX is detected. This embodiment may reduce the number of preambles used.

When a gNB receives a corresponding preamble sequence, the gNB may determine whether to transmit a SIB. For example, if a gNB receives only a preamble sequence 1 for a given beam, the gNB may stop a SIB transmission for that beam. If the gNB receives a preamble sequence 2, the gNB may continue or start the transmission of SIB for that beam regardless of whether it receives preamble 1 or not. If at least one WTRU in a given beam requests a SIB, the gNB may transmit a SIB in that beam. The WTRUs in that beam that already received the SIB may not be required to decode the SIB.

When a beam is active, a WTRU may send an ACK or a NACK using preamble sequence 1 or preamble sequence 2. When a beam is inactive, a WTRU may send a REQ to request a SIB transmission. Since the NACK and the REQ use in two different beam states, the NACK and the REQ they do not overlap. Alternatively, in the active state, a WTRU may send a NACK or REQ. However, it is not necessary for a WTRU to request the same SIB since the SIB has been transmitted due to other WTRUs. If a WTRU already requested the same SIB, this same SIB may be shared and received by all WTRUs residing in the same beam.

It may be possible for WTRUs to expect different SIBs. In this case, even in an active state, a gNB may send different SIBs based on a WTRU request command. For example, there may be some SIBs are always on, some SIBs are on-demand before a RACH procedure and some SIBs are on-demand after a RACH procedure. Each ACK may be time and beam synchronous with each SIB. For example, any one or a combination of the following may occur: a MIB is always on; SIB1/SIB2 are on-demand at a beam level (each beam may serve multiple WTRUs) and may be performed before and after a RACH; SIB3-SIB20 are on demand at a WTRU level and always after a RACH.

The use of on-demand may not always beneficial because common control information is duplicated for each WTRU. However, when the number of WTRUs is small, the use of on-demand may be advantageous. A switch between always-on and on-demand may be used depending on the number of WTRUs in a TRP or a cell.

In LTE, multiple types of system information are contained in different SIBs, and these SIBs may be sent using different resources. In NR, multiple SIBs may be processed jointly before their transmissions. For example, a gNB may simultaneously broadcast multiple SIBs jointly. In another example, a WTRU may request several SIBs or all SIBs, and a gNB may transmit the requested SIBs to the WTRU in one shot.

In NR, the channel coding of these SIBs may be based on Polar codes. There are two rate matching schemes for Polar codes to achieve a desirable coded block size. A first scheme is based on the puncturing of a large sized Polar code. A second scheme is based on the combination of multiple smaller sized Polar codes. A flexible Polar encoding scheme may switch between these two schemes, based on the number of SIBs to be jointly encoded and the coding rate associated with the SIBs. The flexible Polar encoding scheme is needed in order to support the encoding of variable number of SIBs with their associated coding rate.

When there is joint processing of multiple SIBs, each component SIB may have different priorities. For example, SIB1 may be more important than other SIBs and it should be of highest priority. In general, SIB_X is more important than SIB_Y, if X<Y. Hence, SIB_X should be of higher priority than SIB_Y. However, this condition may not be always true. In the case on-demand SIBs (i.e., a WTRU requests to get several SIBs from a gNB), a WTRU may provide the priority order of its required SIBs.

It is known that Polar codes have different reliability levels of its bit channels. When these reliability levels are associated with the priority orders of the SIBs, then a higher priority SIB may be successfully decoded with a higher probability. This association decision could also be incorporated in the flexible Polar encoding scheme.

Figure 13:
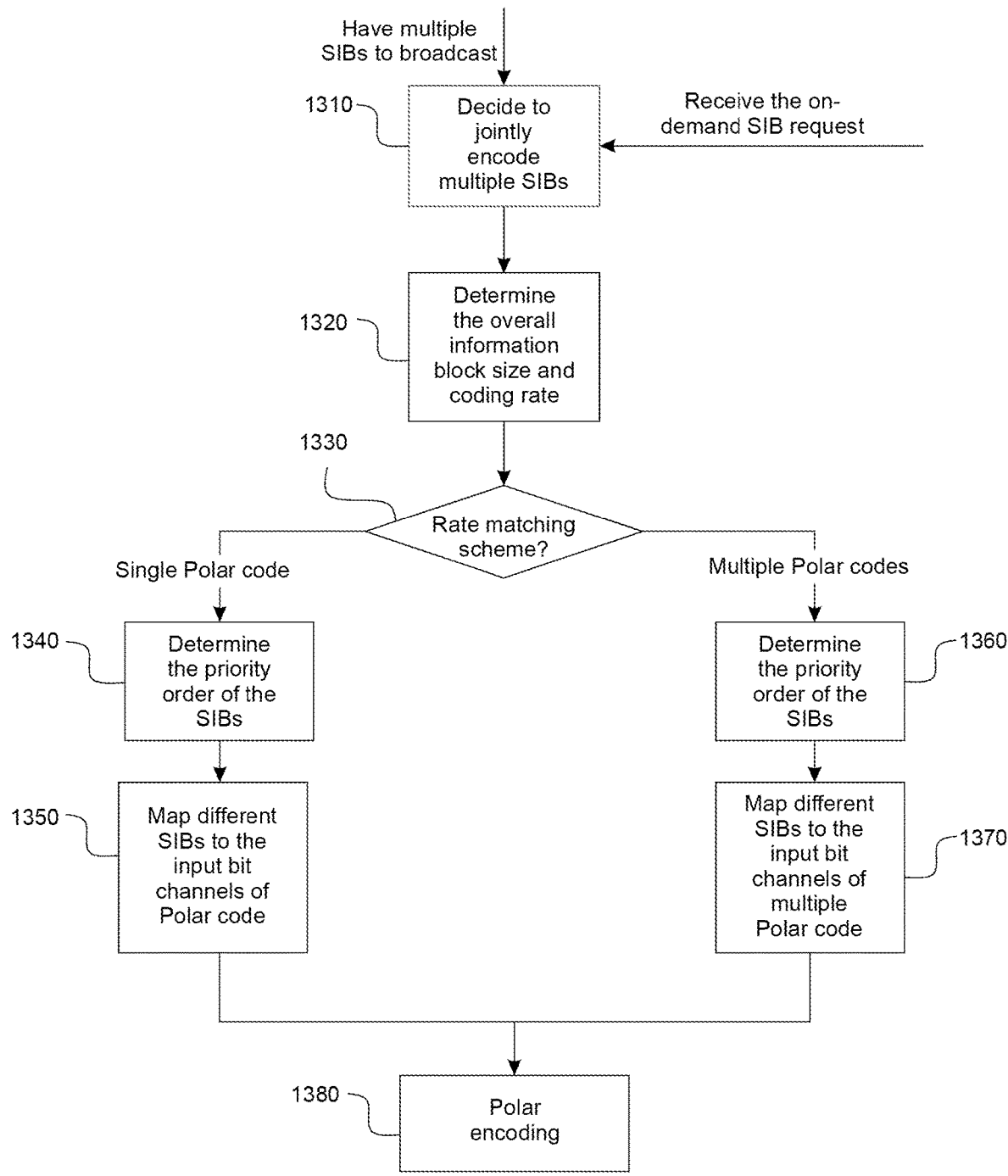
FIG. 13 shows a flow chart diagram of an example of a method for use in a gNB to dynamically determine the Polar encoding scheme for SIBs.

In an embodiment, a NB dynamically determines the Polar encoding scheme for SIBs. FIG. 13 shows a flow chart diagram of an example of a method for use in a gNB to dynamically determine the Polar encoding scheme for SIBs.

As shown in the diagram 1300, in response to the gNB having multiple SIBs to broadcast, or the gNB receives an on-demand SIB request, the gNB decides to jointly encode multiple SIBs 1310. Next, the gNB decides to jointly encode the multiple SIBs 1320. The gNB first calculates the overall information block size of these SIBs and its associated coding rate. This information is used to fix a target coded block size.

Based on the number of coded block bits and the coding rate, the gNB decides on a rate matching scheme 1330. The gNB needs to determine whether it will use a single Polar code with some puncturing or whether it will combine multiple Polar codes to achieve the target coded block size.

For a single Polar code application, the gNB determines the priority order of the jointly encoded SIBs 1340 and then the gNB maps the SIBs to the different input bit channels of the Polar code based on the priority levels of these SIBs 1350. The gNB knows the priority order of the jointly encoded SIBs either by default (i.e., SIB_X>SIB_Y, for X<Y) or by the SIB request messages from a WTRU.

For a multiple Polar codes application, the gNB determines the priority order of the jointly encoded SIBs 1360 and then the gNB maps the SIBs to the input bit channels of multiple Polar codes 1370. First, the gNB aligns bit channel reliability levels among different component Polar codes. Then, the gNB maps the SIBs to the different input bit channels of these Polar codes based on the priority levels of these SIBs. Some XOR operations of the SIB bits may be applied before the mapping. Specifically, some XORed bits will also be mapped to some input bit channels of these polar codes. The gNB knows the priority order of the jointly encoded SIBs either by default or by the SIB request messages from a WTRU.

The gNB then applies the Polar encoding process to the SIBs 1380.

Figure 14:
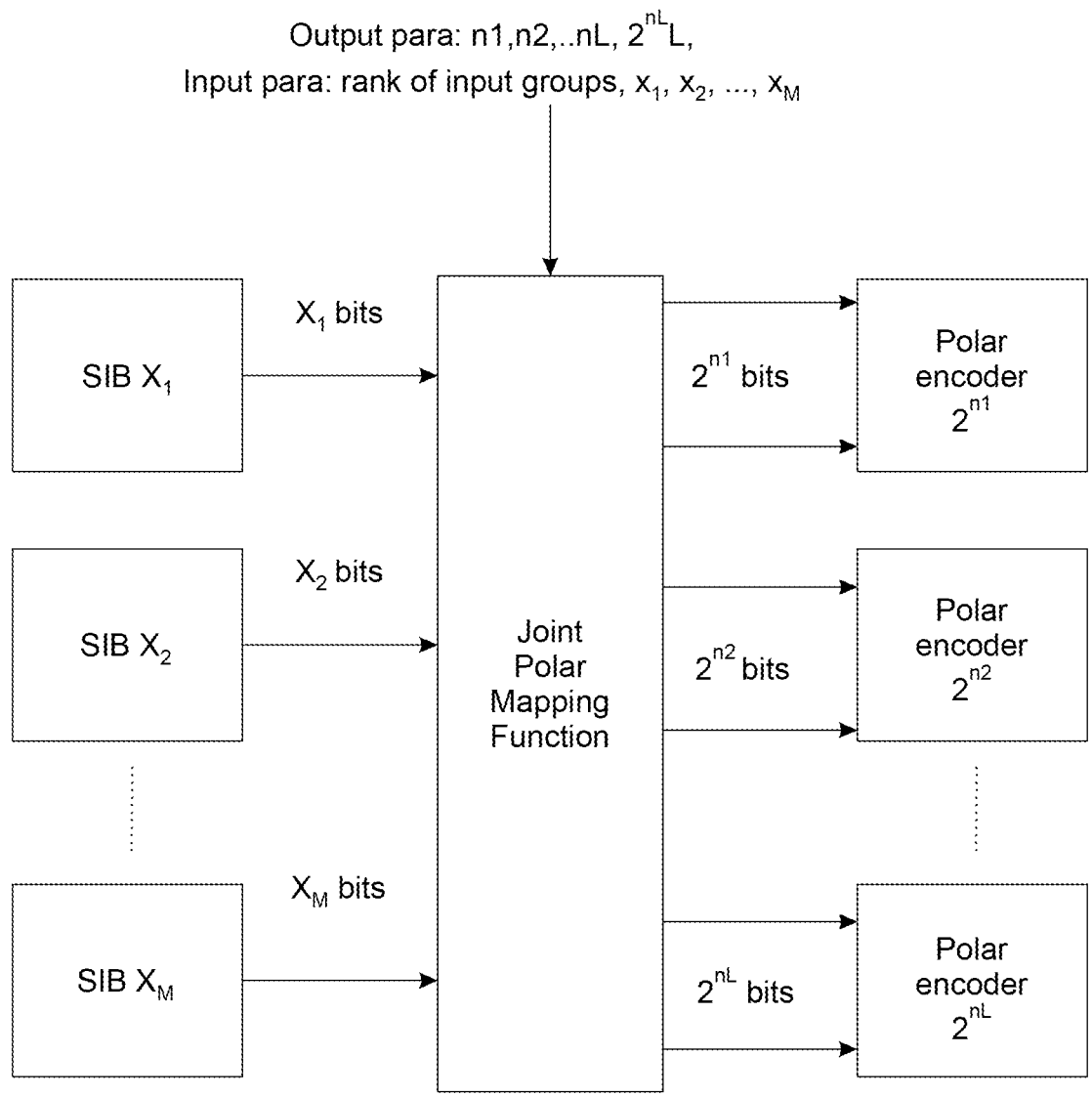
FIG. 14 shows a diagram of an example of Polar mapping function that maps SIBs to the input bit channels of multiple Polar codes.

FIG. 14 shows a diagram of an example of Polar mapping function that maps SIBs to the input bit channels of multiple Polar codes. More particularly, FIG. 14 shows a detailed example of element 1370 found in FIG. 13. As shown in the diagram 1400, M SIBs $X_1, \ldots, X_M$ are to be jointly encoded. It may be calculated from the information block size $\Sigma_{i=1}^{M} X_i$ and the desired coding rate R that the coded block size is $$\frac{\sum_{i=1}^{M} X_i}{R}$$

bits. In FIG. 14 the decision is made to use L Polar codes, with their respective block sizes $n_1, \ldots, n_L$ bits, since $$\frac{\sum_{i=1}^{M} X_i}{R} = \sum_{i=1}^{L} n_i.$$

Because the priority order of the SIBs is known, the priority order of the input bits is also determined. Based on this information, a joint Polar mapping function designs a binary mapping matrix J of size $\Sigma_{i=1}^{M} X_i$ by $\Sigma_{i=1}^{M} n_i$. The output of the joint Polar mapping function may be calculated as:

$$[b_{1,1}, \ldots, b_{1,X_1}, b_{2,1}, \ldots, b_{2,X_2}, \ldots, b_{M,1}, \ldots, b_{M,X_M}] \cdot J$$

The design of J accounts for the priority levels and the sizes of multiple Polar codes.

Figure 15:
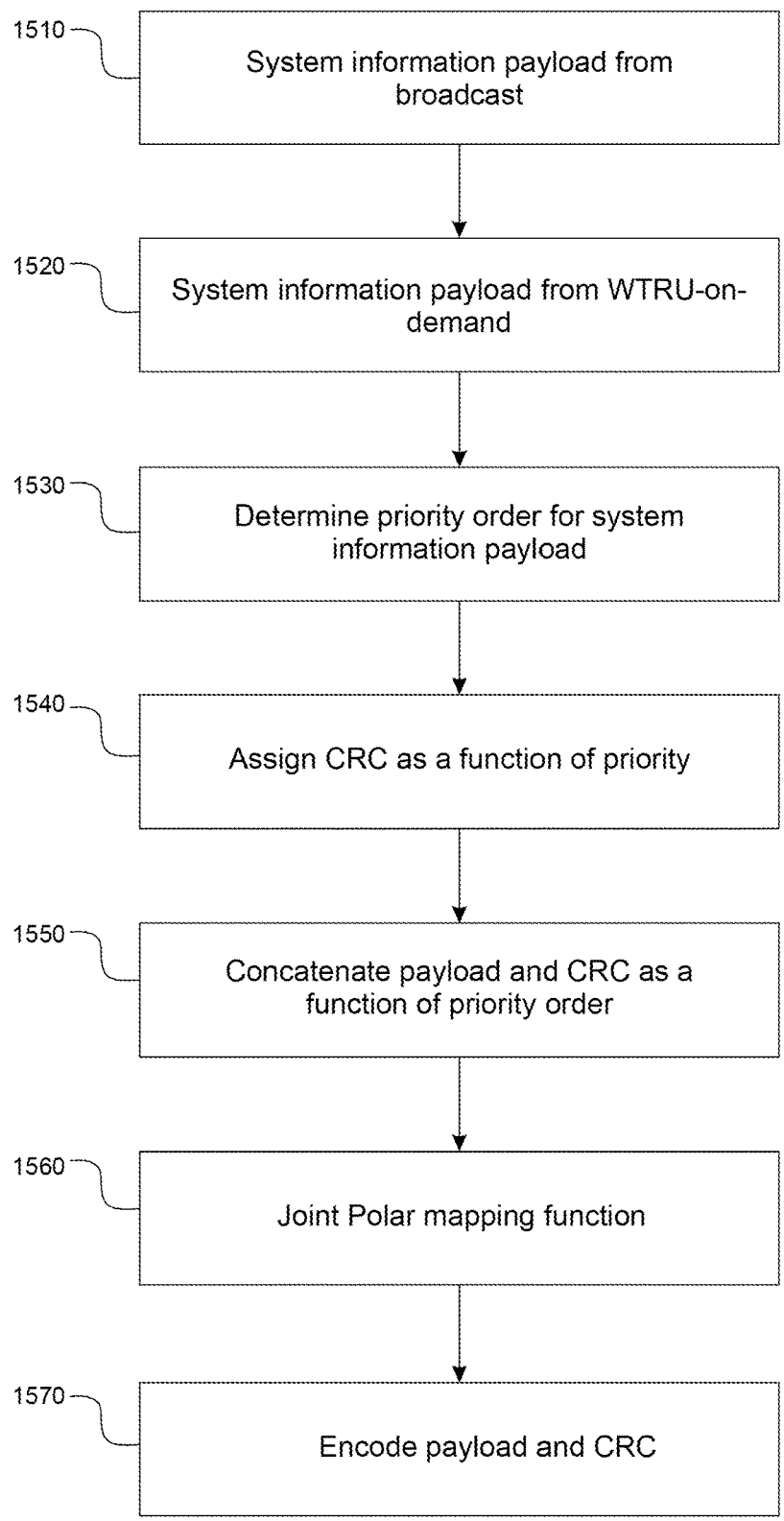
FIG. 15 shows a flow chart diagram of an example of system information transmission and processing in a gNB.

FIG. 15 shows a flow chart diagram of an example of system information transmission and processing in a gNB. As shown in the diagram 1500, the gNB determines whether it has multiple SIBs to be broadcast 1510. The gNB may also receive on-demand SIB request from one or more WTRUs 1520. The gNB determines a priority order for a system information payload 1530.

A CRC may be attached to one or multiple SIBs when the one or multiple SIBs are transmitted simultaneously in the system information payload. Depending on the priority of the system information, the gNB may assign a CRC to each SIB or a CRC may be assigned to a category of SIBs 1540. A high priority CRC may be assigned to a high priority SIB or SIB category while a low priority CRC may be assigned to low priority SIB or SIB category. A priority of system information may be predefined or it may be based on the need of a WTRU. A priority list for system information may be provided by a WTRU when the WTRU requests system information.

The gNB then concatenates the payload and CRC as a function of priority order 1550, maps different SIBs to the input bit channels of multiple Polar codes 1560, and encodes the payload and CRC 1570.

Figure 16:
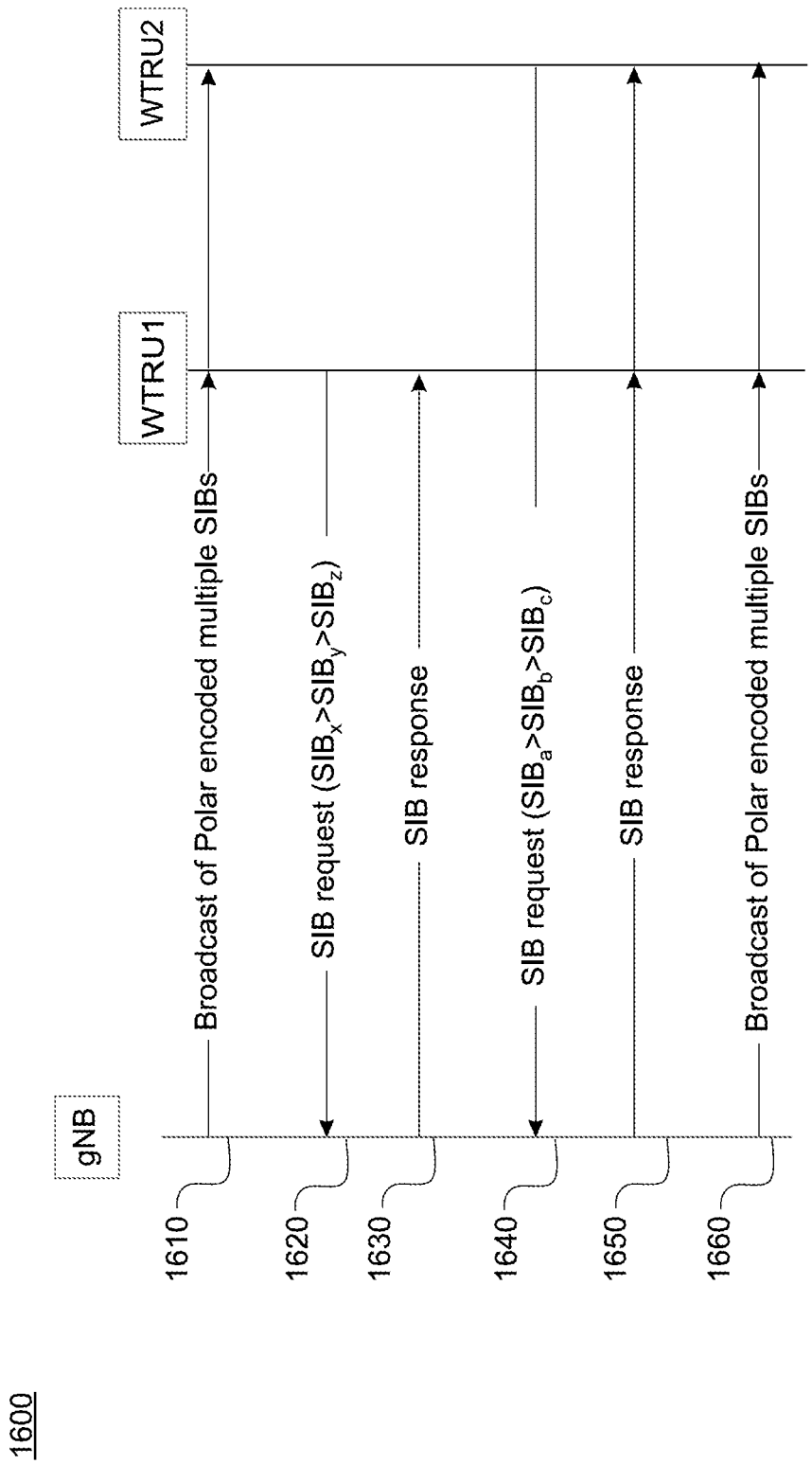
FIG. 16 shows a signaling diagram of an example message flow between a gNB and multiple WTRUs for a SIB transmission.

FIG. 16 shows a signaling diagram of an example message flow between a gNB and multiple WTRUs for a SIB transmission. As shown in the diagram 1600, the gNB may broadcast multiple SIBs simultaneously with the encoding of these SIBs based on a single or multiple polar codes 1610. The Polar encoding scheme selection may depend on the procedures described above in FIG. 13.

WTRU1 may send a SIB request message to the gNB 1620. WTRU1 may request several SIBs with a priority order. For example, WTRU1 may request three SIBs with the priority order of SIB_x>SIB_y>SIB_z. If priority order information is not provided, then the gNB may assume that the SIBs are in a default priority order (i.e, SIB_x>SIB_y if x<y). The gNB selects a Polar encoding scheme based on the SIB request using the method described in FIG. 13. The gNB then sends the SIB response message to WTRU1 1630.

The gNB may also receive a SIB request from WTRU2 1640 and send a SIB response message to WTRU2 1650. The gNB may then also broadcast multiple SIBs simultaneously again 1660.

In an embodiment, a WTRU may request system information via common control channel. For example, a WTRU may request system information via a SI-RNTI PDCCH/PDSCH and a schedule request (SR) or the like.

In another embodiment, a WTRU may request system information via a dedicated channel. For example, a WTRU may request system information via a C-RNTI PDCCH/PDSCH and a dedicated UL control or the like.

There are two schemes that may be used for a WTRU-specific request for a SIB transmission.

According to a first scheme, predefined time locations are used for SIB transmissions. The SIB may not be always transmitted. However, when a SIB is transmitted, the SIB is transmitted in the predefined time locations. This may improve energy efficiency because all SIBs are transmitted in the predefined time by request causing the beam energy for the SIBs to be low.

In the first scheme, when a WTRU requests a SIB transmission, a gNB may transmit the SIB based on the request from the WTRU. If the time when the WTRU requests the SIB is x time units ahead of SIB predefined time locations, then the gNB may transmit the SIB in a next immediate SIB transmission time location. Otherwise, the gNB may wait until a next opportunity for the SIB transmission in following SIB predefined time locations. The time unit of x may be an OFDM symbol, a time symbol, a TTI or the like. The value of x may depend on systems and designs and the value of x may be configurable or predefined. For example, x may be a few OFDM symbols or one TTI. If a SIB time location is TTI #n, x may be TTI #n−k where k=1 or k>1. In this example, a common control channel may be used and a SI-RNTI may be masked with a PDCCH to schedule the SIB via a PDSCH.

Figure 17:
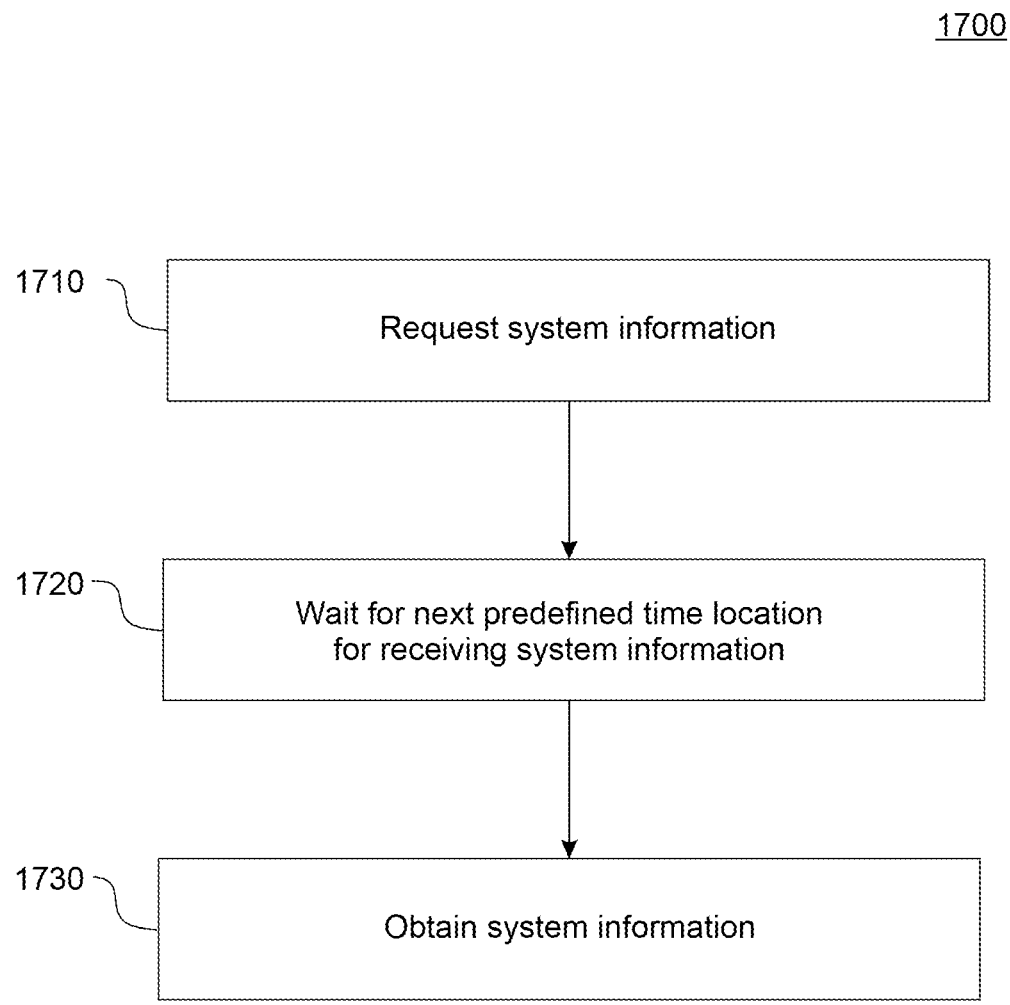
FIG. 17 shows a flow chart diagram of using predefined time locations for SIB transmissions.

FIG. 17 shows a flow chart diagram of using predefined time locations for SIB transmissions. As shown in the diagram 1700, a WTRU sends a request to a gNB for system information 1710. The WTRU then waits for a next predefined time location to receive the requested system information 1720. The system information is then obtained by the WTRU at the predefined time location 1730.

In a second scheme, aperiodic time locations are used for SIB transmissions. The aperiodic time locations are determined based on when a WTRU request a SIB transmission. This scheme may have higher energy cost because SIBs may be transmitted anytime which may consume beam energy if many WTRUs request SIBs at different times. This scheme does not have predefined time locations for SIB transmissions. The second may be partial WTRU-specific (via SI-RNTI) or total WTRU-specific (via C-RNTI).

In the second scheme, when a WTRU requests a SIB transmission, the gNB may transmit the SIB based on the request from the WTRU. Because the second scheme does not have predefined time locations for SIB transmissions, the gNB may transmit the SIB immediately without waiting for a SIB transmission opportunity. The gNB may use a PDCCH masked with cell RNTI (C-RNTI) to schedule the SIB transmission for the WTRU.

Figure 18:
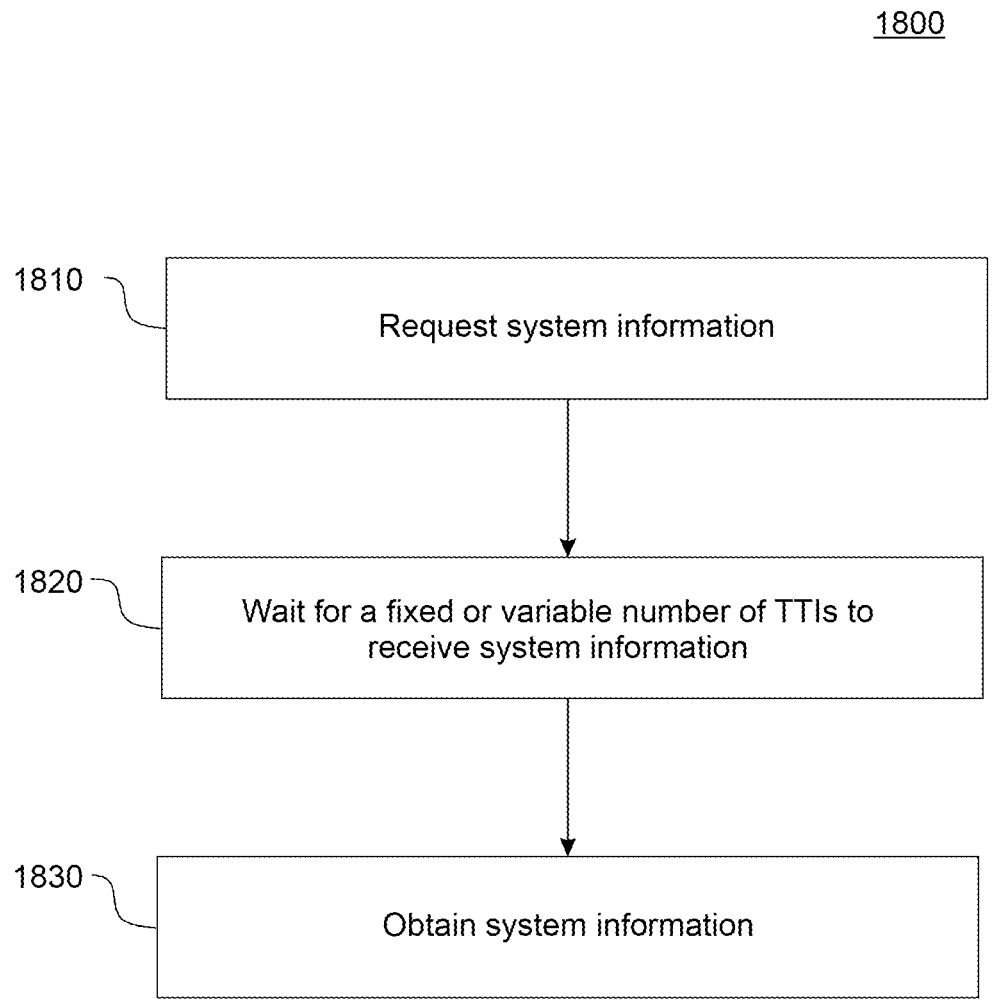
FIG. 18 shows a flow chart diagram of using periodic time locations for SIB transmissions.

FIG. 18 shows a flow chart diagram of using periodic time locations for SIB transmissions. As shown in the diagram 1800, a WTRU sends a request to a gNB for system information 1810. The WTRU then waits for a predefined fixed or variable number of TTIs to receive the requested system information 1820. The system information is then received by the WTRU at the predefined time location 1830.

The first scheme is partially WTRU-specific. The second scheme is WTRU-specific.

Although the first scheme is based on a WTRU-specific request for a SIB transmission, a SI-RNTI is used. Therefore, other WTRUs may still be able to receive and decode a PDCCH using the SI-RNTI and decode a PDSCH for the SIB transmission.

According to the first scheme, when a WTRU requires a SIB, the WTRU may first try to decode SIB in predefined time locations. Different SIBs may have the same or different predefined time locations. The WTRU may wait for those corresponding time locations to receive the SIB that it requires. If the WTRU can decode the required SIB, the WTRU may not request a SIB. If the WTRU cannot decode the SIB, the WTRU may request a SIB if it is needed by WTRU.

The WTRU may not be able to decode the SIB due to SIBs being requested on-demand. If a WTRU does not request the SIB that another WTRU needs, this particular SIB may not be transmitted in those time location, and the WTRU may not find decode the SIB because the SIB is absent.

SIB overhead may be reduced using a common control channel. Because SIB delivery using a common control channel or using a dedicated WTRU-specific control channel each has its own advantages and disadvantages in terms of signaling overhead and latency to receive the SIB depending on the number of WTRUs in a system, a system may use a switching mechanism between using a common control channel and using a WTRU-specific control channel.

In an embodiment, a gNB uses both a common control channel and a WTRU-specific control channel for SIB delivery. When the number of WTRUs in communication with a gNB is above a threshold and signaling overhead is high, the gNB switches to a common control channel scheme that uses predefined time locations for SIB transmissions. Otherwise, the gNB switches to a dedicated WTRU-specific control channel scheme that uses aperiodic time locations for SIB transmissions.

In an embodiment, system information may be transmitted before and after a random access procedure. More particularly, non-essential system information is transmitted in a random access channel and non-essential information is transmitted in a random access response channel. This embodiment may be combined with a selective beam sweep.

When a small number of WTRUs access a cell or a carrier, random access response control signaling may be used to reduce the overhead. Because the system information transmission overhead caused by a beam sweep may be high, sending system information in response to a request from a WTRU via a RACH random access response (RAR) in a RACH procedure to reduce transmission overhead. This is beneficial when the number of WTRUs is small for a cell or a beam.

A WTRU may use a preamble or a RACH resource to request a SIB transmission. Hereinafter, the terms preamble and RACH resource are used interchangeable. When a gNB receives the preamble, the gNB may use a random access response for a SIB transmission (or system information). The preamble contains system information or SIB request information.

The WTRU may detect the random access response to obtain the SIB transmission. A PDCCH masked with a RA-RNTI may be used to schedule a PDSCH for a SIB transmission. When multiple WTRUs use the same time and frequency resources, the same RA-RNTI may be used for the WTRUs when a PDCCH is transmitted. Accordingly, multiple WTRUs may receive the same PDCCH with the same RA-RNTI. The WTRU that requests the SIB transmission may try to decode the PDCCH with the RA-RNTI. Although the SIB is also transmitted to other WTRUs with the same RA-RNTI, the other WTRUs may ignore the SIB by not decoding it. If the other WTRUs also need the same SIB, the system information may be shared among these WTRUs using the random access response.

In an embodiment, a WTRU may use only a preamble (e.g., a preamble resource, a preamble sequence, and the like) to request system information. The system information that is requested is any one or a combination of system information, a set of system information, a SIB, a set of SIBs, and the like. The system information is received in a SIB transmission.

The preamble may carry or contain SIB request information where different preambles, such as resources or sequences, may indicate different SIB requests. For example, preamble #x may be used to indicate or request SIB #x. As described herein, a preamble may be a preamble sequence or a preamble resource or combination of a preamble sequence and a preamble resource. A preamble resource may be any one or a combination of a preamble time resource, a preamble frequency resource, and a preamble spatial resource.

One or more preambles, such as one or more preamble sequences or preamble resources may be used to indicate different SIB requests. For example, preamble sequence #x may correspond to SIB #x and a WTRU may use preamble sequence #x to request SIB #x. When a WTRU wants to request SIB #x, the WTRU may select preamble sequence #x and transmit the selected preamble sequence #x.

In another example, preamble time resource #x may correspond to SIB #x and a WTRU may use preamble time resource #x to request SIB #x. When a WTRU wants to request SIB #x, the WTRU may select preamble time resource #x and transmit the preamble sequence in preamble time resource #x.

In another example, preamble frequency resource #x may correspond to SIB #x and a WTRU may use preamble frequency resource #x to request SIB #x. When a WTRU wants to request SIB #x, the WTRU may select preamble frequency resource #x and transmit the preamble sequence in preamble frequency resource #x.

The terms preamble, preamble resource, PRACH resource, and RACH resource may be used interchangeably.

There may be an association between a preamble and a SIB. There may be an association between a preamble resource and a SIB. The preamble resource may be any one or a combination of a preamble time resource, a preamble frequency resource, and a preamble sequence.

An association between a preamble sequence and a SIB may be used. In an example association, one preamble may be associated with one SIB. Preamble sequence #x may be associated with SIB #x. When a WTRU wants to request SIB #x, the WTRU may select preamble sequence #x and transmit the selected preamble sequence. In another example association, one preamble may be associated with multiple SIBs. Preamble sequence #x may be associated with SIB #x and SIB #y. When a WTRU wants to request SIB #x or SIB #y, the WTRU may select preamble sequence #x and transmit the selected preamble sequence. In yet another example association, multiple preamble sequences may be associated with one SIB. Preamble sequence #x and #y may be associated with SIB #x. When a WTRU wants to request SIB #x, the WTRU may select preamble sequence #x or #y and transmit either preamble sequence #x or #y. The WTRU may transmit both preamble sequence #x and #y when multiple preamble sequence transmission is used or enabled.

An association between a preamble time resource and a SIB may be used. In an example association, one preamble time resource may be associated with one SIB. Preamble time resource #x may be associated with SIB #x. When a WTRU wants to request SIB #x, the WTRU may select preamble time resource #x and transmit the preamble sequence. In another example association, one preamble time resources may be associated with multiple SIBs. Preamble time resource #x may be associated with SIB #x and SIB #y. When a WTRU wants to request SIB #x or SIB #y, the WTRU may select preamble time resource #x and transmit the preamble. In yet another example association, multiple preamble time resources may be associated with one SIB. Preamble time resources #x and #y may be associated with SIB #x. When a WTRU wants to request SIB #x, the WTRU may select preamble time resources #x or #y and transmit the preamble. The WTRU may transmit the selected preamble in both preamble time resources #x and #y when multiple preamble time resources transmission is used or enabled.

Similarly, an association between a preamble frequency resource and a SIB may be used. Likewise, an association between a preamble time resource, a preamble frequency resource, and a preamble sequence and a SIB may be used.

If a WTRU is indicated with the association between a preamble (e.g., a sequence, a resource, and the like) and a SIB, the WTRU may use the preamble to request the SIB. If a WTRU is not indicated with the association for the preamble and the SIB, the WTRU may use a control field in a payload (e.g., RACH message 3) to request SIB.

A single association or mapping may be used to indicate the association between a preamble and a SIB. An association indication of 1 bit may be used. A WTRU may be indicated either with or without association. For example, "1" may indicate "with association" and "0" may indicate "without association".

Alternatively, more than one associations or mappings may be used to indicate the association between a preamble and a SIB. An association indication of N bits may be used. Two options may be used. In one option, two indicators may be used, a first indicator (e.g., 1 bit) may indicate "with" or "without" association and a second indicator (e.g., N bits) may indicate which association should be used if the WTRU receive the first indicator indicating "with" association. In the other option, a single indicator (e.g., N bits) uses joint coding of "with" and "without" association and multiple associations. For example, a 2-bit single indicator may be used to indicate 3 associations. In the example, "00" may indicate "without" association, "01" may indicate "association 1", "10" may indicate "association 2", and "11" may indicate "association 3".

Association indication may be part of RACH configuration and association indication may be carried or included in a broadcast signal or channel, such as a synchronization signal (SS), remaining minimum system information (RMSI), a NR-PBCH, or other system information (OSI).

In an embodiment, a WTRU may use a preamble with an additional control field where the control field is used to request additional system information or SIBs. The control field may or may not be attached to the preamble. The control field may be sent separately from the preamble. The control field may be included in a payload (e.g., RACH message 3). For example, a preamble may be in one RACH message (e.g., RACH message 1) and the control field may be sent in another RACH message (e.g., RACH message 3). The control field may contain a REQ or a SIB request command. One or more bits may be used in the control field (e.g., SIB_REQ_FIELD) to indicate a number of SIBs. For example, in order to indicate 20 SIBs, a 5 bit control field may be used. In another example, the preamble may be used to request system information or one or more SIBs and the control field may be used to request additional system information or one or more additional SIBs.

In an embodiment, a WTRU may use a preamble with an attached control field where the joint preamble and control field are used to request system information or SIB transmissions. The preamble may be divided into M preamble groups where each group indicates a SIB or a category of SIB. The category of SIB may be based on priority or importance. For example, preamble group 1 may be used for essential or urgent SIBs and preamble group 2 may be used for the SIBs that are not in the category of essential or urgent SIBs. In another example, preamble group 1 may be used for the most critical or urgent SIBs, preamble group 2 may be used for moderate critical or less urgent SIBs, and preamble group 3 may be used for the least critical or low priority SIBs. After the category of SIBs is indicated, a particular SIB may be indicated using the control field. One or more bits in the preamble may be used as a control field (e.g., SIB_REQ_FIELD) to indicate a number of SIBs. For example, in order to indicate 18 SIBs with three preamble groups where each preamble group has three SIBs categories of 6 SIBs each, a 3 bit control field may be used to indicate the 6 SIBs in each category. The SIBs may be also be jointly indicated using a preamble and a preamble group.

In an embodiment, a WTRU may use a SR, a MAC control element (CE), a PUCCH, a PUSCH, or another UL signal to request system information or a SIB transmission.

In an embodiment, system information is multiplexed before being signaled. For example, essential system information and non-essential system information may be multiplexed together with other signals (e.g., a SYCH signal).

A broadcast channel (BCH) may use transmit or beam diversity because the information on different beams is the same. For example, cyclic delay diversity (CDD) or STBC, SFBC or the like may be used. Furthermore, a gNB or a TRP may transmit different broadcast beams using a combination of transmit diversity at different sub-bands.

After a WTRU acquires synchronization and a NR cell ID, the WTRU may decode a PBCH to acquire the essential system information. To support fast access, the same PBCH may be repeated over multiple beams. Within the same beam, the time-frequency resource for the PBCH may be linked with a SS. The PBCH and the SS may be within the same SS/PBCH block. The PBCH and the SS may be multiplexed in FDM or TDM manner. In a TDM scheme, the frequency resource for carrying the PBCH and the SS may be minimized in order to support the WTRUs with narrow bandwidth. In a FDM scheme, access delay may be reduced but a larger minimum bandwidth may be required for a WTRU.

In an embodiment, a periodic SR is used to request a SIB transmission if an UL control channel is not scheduled. For example, in a SR with QPSK, a first bit is indicates SR and a second bit indicates SIB_REQ.

In an embodiment, a WTRU-specific uplink control signal is used to request a SIB transmission if an UL control channel is scheduled. For example, a PUCCH or the like may be used to transmit a SIB request. A PUCCH format X may be used for the SIB request and the PUCCH format X includes a control filed for SIB request (i.e., SIB_REQ). The control field may be a 1 bit control field. If a PUSCH is scheduled in the same timeslot in the uplink, the control filed for SIB request may be piggybacked in a data channel and transmitted in the PUSCH without being transmitted in PUCCH.

Figure 19:
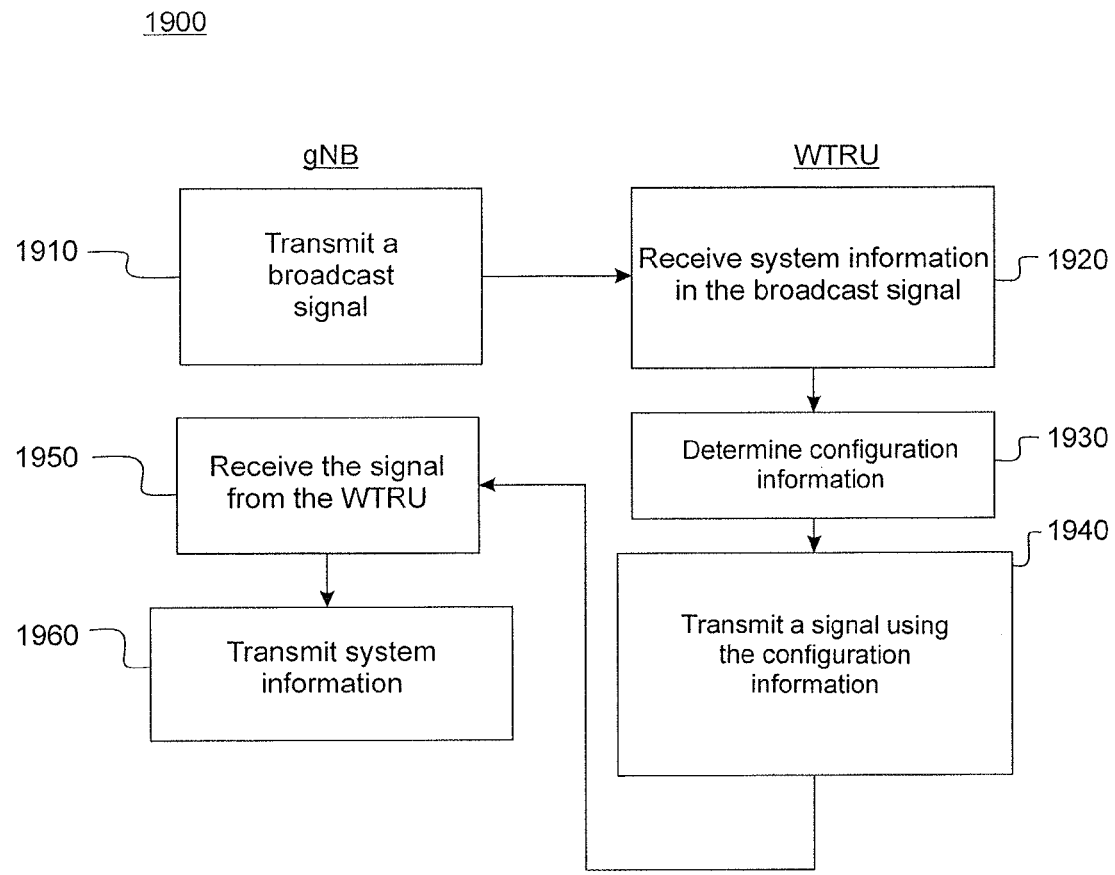
FIG. 19 shows a flow chart diagram of an example method for use in a gNB and one or more WTRUs for signaling system information.

FIG. 19 shows a flow chart diagram of an example of method for use in a gNB and one or more WTRUs for signaling system information in response to a request from a WTRU.

As described above and in diagram 1900, a gNB transmits a broadcast signal including system information 1910. The broadcast signal may be transmitted in one or more directional beams. The broadcast signal may be an always-on signal. The broadcast signal may be transmitted over a PBCH or a similar channel. The broadcast signal may also be transmitted over a channel carrying remaining minimum system information (e.g., NR-PDSCH). The system information included in the broadcast signal may provide configuration information, which includes any one or a combination of a resource allocation, mapping information, a resource indication, and a mode indication directing the behavior of the WTRU. The configuration information may include an indication regarding whether the WTRU is able to transmit any one or a combination of a request signal, a feedback signal, or neither to the gNB. The configuration information may allow the WTRU to request system information or one or more SIB transmissions. The configuration information may be part of RACH configuration or different from RACH configuration. The configuration information may be carried or included in broadcast signal or channel, such as a synchronization signal (SS), remaining minimum system information (RMSI), a NR-PBCH, or other system information (OSI). The system information may be referred to as first system information or remaining minimum system information.

A WTRU receives the system information in the broadcast signal 1920. The WTRU then determines configuration information using the broadcast signal in order to request system information 1930. In an example, the WTRU determines whether the WTRU may transmit any one or a combination of a request signal, a feedback signal, or neither to the gNB in a signal.

The WTRU transmits a signal using the configuration information associated with the received system information 1940. In an embodiment, the transmitted signal is a request signal. The transmitted signal may include a preamble. The preamble may be referred to as a preamble sequence or a preamble time/frequency resource. The preamble in the transmitted signal may contain or indicate system information request information. The preamble may be associated with one or more SIBs. In an embodiment, the preamble is associated one or more groups of SIBs and each group of SIBs may be associated with a priority level. In an embodiment, the transmitted signal includes a control field that indicates additional SIB request information. The transmitted signal may include any one or a combination of the preamble and the control field.

The gNB receives the signal from the WTRU 1950 and the gNB then transmits system information to the WTRU 1960. The system information received in response to the transmitted signal may be received periodically in predefined time locations. Alternatively, the system received in response to the transmitted signal may be received aperiodically based on the transmitted signal. The transmitted system information may be referred to as second system information or other system information transmissions (SIBs).

Although the features and elements are described above in particular combinations, each feature or element can be used alone without the other features and elements or in various combinations with or without other features and elements. For example, in an embodiment, a WTRU may be configured to transmit including any one or a combination of a feedback signal, a request signal, and a preamble to a gNB to request a system information transmission or SIB.

Although the solutions described herein consider LTE, LTE-A, NR or 5G specific protocols, it is understood that the solutions described herein are not restricted to this scenario and are applicable to other wireless systems as well.

The invention claimed is:

1. A method performed by a wireless transmit/receive unit (WTRU), the method comprising:
   selecting a beam from a plurality of beams from a base station;
   receiving, using the selected beam, periodically transmitted broadcast information, the periodically transmitted broadcast information including a first information block and a second information block;
   based on information in the received second information block, transmitting a random access preamble;
   after the transmission of the random access preamble, receiving a random access response;
   based on information in the received random access response, transmitting a message including control information indicating additional information blocks that the WTRU is requesting to receive; and
   after transmission of the transmitted message, receiving the additional information blocks.

2. The method of claim 1, wherein the transmitted first information block is transmitted with a primary synchronization signal and a secondary synchronization signal.

3. The method of claim 1, wherein the first information block is a master information block (MIB), the second information block is a system information block (SIB) type 1 (SIB 1), the additional information blocks are additional SIBs, and the transmitted message is a message 3 (MSG3).

4. The method of claim 1, wherein the transmitted message is transmitted to the base station to request on-demand additional information blocks.

5. The method of claim 1, wherein the transmitted random access preamble is associated with the selected beam.

6. The method of claim 1, further comprising:
   transmitting information requesting beams and receiving data using one of the requested beams.

7. The method of claim 1, wherein at least the first information block is swept over the plurality of beams.

8. The method of claim 1, wherein at least one of the additional information blocks is received using a beam of the plurality of beams that is different from the selected beam.

9. The method of claim 8, wherein the beam that is used to receive the at least one of the additional information blocks is indicated in downlink control information (DCI).

10. A wireless transmit/receive unit (WTRU) comprising:
    a transceiver; and
    a processor operatively coupled to the transceiver;
    wherein:
       the transceiver and the processor are configured to select a beam from a plurality of beams from a base station;
       the transceiver is configured to receive, using the selected beam, periodically transmitted broadcast information, the periodically transmitted broadcast information including a first information block and a second information block;
       the transceiver and the processor are configured to transmit, based on information in the received second information block, a random access preamble;
       the transceiver is configured to receive, after the transmission of the random access preamble, a random access response;
       the transceiver and the processor are configured to transmit, based on information in the received random access response, a message including control information indicating additional information blocks that the WTRU is requesting to receive; and
       the transceiver is configured to receive, after transmission of the transmitted message, the additional information blocks.

11. The WTRU of claim 10, wherein the transmitted first information block is transmitted with a primary synchronization signal and a secondary synchronization signal.

12. The WTRU of claim 10, wherein the first information block is a master information block (MIB), the second information block is a system information block (SIB) type 1 (SIB 1), the additional information blocks are additional SIBs, and the transmitted message is a message 3 (MSG3).

13. The WTRU of claim 10, wherein the transmitted message is transmitted to the base station to request on-demand additional information blocks.

14. The WTRU of claim 10, wherein the transmitted random access preamble is associated with the selected beam.

15. The WTRU of claim 10, wherein the transceiver and the processor are further configured to transmit information requesting beams and the transceiver is further configured to receive data using one of the requested beams.

16. The WTRU of claim 10, wherein at least the first information block is swept over the plurality of beams.

17. The WTRU of claim 10, wherein at least one of the additional information blocks is received using a beam of the plurality of beams that is different from the selected beam.

18. The WTRU of claim 17, wherein the beam that is used to receive the at least one of the additional information blocks is indicated in downlink control information (DCI).

* * * * *